(12) United States Patent
Scott et al.

(10) Patent No.: US 9,462,754 B2
(45) Date of Patent: Oct. 11, 2016

(54) TOBACCO PRODUCTION SYSTEM

(75) Inventors: G. Lea Scott, Midlothian, VA (US); Joshua F. Warren, Elm City, NC (US)

(73) Assignee: UNIVERSAL LEAF TOBACCO COMPANY, INC., Richmond, VA (US)

( * ) Notice: Subject to any disclaimer, the term of this patent is extended or adjusted under 35 U.S.C. 154(b) by 1244 days.

(21) Appl. No.: 13/416,637

(22) Filed: Mar. 9, 2012

(65) Prior Publication Data
US 2013/0048000 A1  Feb. 28, 2013

Related U.S. Application Data

(60) Provisional application No. 61/526,800, filed on Aug. 24, 2011.

(51) Int. Cl.
| | |
|---|---|
| A24B 3/12 | (2006.01) |
| A01G 1/00 | (2006.01) |
| A24B 1/00 | (2006.01) |
| A24B 5/00 | (2006.01) |
| A24B 5/16 | (2006.01) |

(52) U.S. Cl.
CPC . *A01G 1/00* (2013.01); *A24B 1/00* (2013.01); *A24B 5/00* (2013.01); *A24B 5/16* (2013.01)

(58) Field of Classification Search
CPC ............ A24B 1/00; A24B 5/16; A24B 5/00; A01G 1/00
See application file for complete search history.

(56) References Cited

U.S. PATENT DOCUMENTS 3,219,042 A    11/1965 Molins
3,785,385 A *   1/1974 Johnson ................. A24B 3/185
                                                131/292

FOREIGN PATENT DOCUMENTS

EP    1 754 416      *  2/2007
WO   2008110876 A1    9/2008

OTHER PUBLICATIONS

Sheen, S.J., "Biomass and Chemical Composition of Tobacco Plants Under High Density Growth", Beitrage zur Tabakforschung International, Feb. 1983, vol. 12, No. 1, pp. 35-42.*
Anten, Niels P. R. et al, "Effects of Mechanical Stress and Plant Density on Mechanical Characteristics, Growth, and Lifetime Reproduction of Tobacco Plants", The American Naturalist, Dec. 2005, vol. 166, No. 6, pp. 650-660.*
Hanson et al., "Alternative Uses for Tobacco, MD" National Food and Agriculture (NIFA) Project No. MD-MAES-0630, project description available as USDA CRIS No. 207838 (2007).
Todd, "Crops for Biomass and Small Molecule Production" presentation (2008), 21 pages.
Arlen et al., "Field production and functional evaluation of chloroplast-derived interferon-α2b," Plant Biotechnol J. 5(4):511-525 (2007).
Fisher, L. R., A. M. Stewart, W. D. Smith, G. Tart, and K. Barnes, 2011 Flue-cured Production Guide, North Carolina Cooperative Extension Service, North Carolina State University, AG-187. pp. 25-48.
Suggs et al., "Physical Properties of Green Virginia-Type Tobacco Leaves," Tob.Sci.4:194 (1960), 4 pages.
Sheen, S.J., "Biomass and chemical composition of tobacco plants under high density growth," Beitraage zur Tabakforschung International, vol. 12, No. 1, Feb. 1983, pp. 35-42.
Chang C.S. et al., "The yield of biomass and leaf protein of tobacco plants grown at high density with multiple harvest," Bulletin of Taiwan Tobacco Research Institute, Taiwan Tobacco & Wind Monopoly Bureau, Taiwan, vol. 32, Jul. 1, 1990, pp. 1-7.
Invitation to Pay Additional Fees, and Partial International Search for PCT/US2012/051409, mailed Jan. 17, 2013.
Bowman et al., A Historical Overview of Flue-Cured Tobacco Breeding in the U.S.A.; Tobacco Science, Sep. 23, 2009, URL:http://www.tobaccoscienceonline.org/doi/pdf/.
Smiley et al., Tobacco Stalks and Stems Fertility Value and Use; UKY, AGR-23, Jun. 1, 1999, USA, URL:http://www.ca.uky.edu/agc/pubs/agr/agr23/agr23.htm.
Santos, Caracterização fenoipica e molecular de genótipos de fumo utilizados no sul do Brasil; Universidade Federal do Rio Grande do Sul, Apr. 2002, URL:http://www/lume.ufrgs.br/bitstream/handle/10183/3291/000335366.pdf.
International Search Report and Written Opinion for PCT/US2012/051409, mailed Mar. 13, 2013.
African Regional Intellectual Property Organization (ARIPO) Office Action dated Jun. 16, 2016 for Appln. No. AP/P/2014/007519.

* cited by examiner

Primary Examiner — Joseph S Del Sole
Assistant Examiner — Dionne Walls Mayes
(74) Attorney, Agent, or Firm — Pillsbury Winthrop Shaw Pittman, LLP

(57) ABSTRACT

A tobacco production system is provided for producing useable tobacco material having chemical and physical properties acceptable to tobacco industry stakeholders, by growing tobacco entirely in a directly seeded system, under an intensive biomass growing system, mechanically harvesting above-ground portions of the plant a plurality of times during the growing season, curing tobacco leaves and stalks together, and processing the cured tobacco material to obtain cured leaf material suitable for use in tobacco products including, but not limited to, cigarettes, cigars, snus, snuff, chewing tobacco, pipe tobacco, reconstituted tobacco material, and other manufactured tobacco products.

17 Claims, No Drawings

TOBACCO PRODUCTION SYSTEM

RELATED APPLICATIONS

This application claims the benefit of priority to U.S. Patent Application Ser. No. 61/526,800, filed Aug. 24, 2011, the disclosure of which is incorporated herein by reference in its entirety.

BACKGROUND

1. Field

The present disclosure relates to a system for production of a low cost tobacco material.

2. Description of Related Art

In conventional tobacco production practices, tobacco seeds are germinated in a greenhouse or outdoor plant beds to produce seedlings that are then transplanted into the field in carefully spaced arrangements (for example, in some instances plants are spaced 0.3-3 feet apart in a row and rows spaced 1-4 feet apart). Growth of the tobacco plant is often manipulated to increase yield and leaf quality, by topping to remove developing flower heads which induces growth of lateral shoots (suckers), and suckering to decrease excessive sucker growth. Topping is often done by hand or mechanically, and suckers are often controlled chemically, although some clean-up by hand is also often done. Tobacco is harvested and cured, with only the leaves typically being marketed. Tobacco harvesting is usually carried out in stages, with the ripest (lowest) leaves of each plant removed mechanically or by hand, and the majority of tobacco plants harvested two or three times during the growing season. Some tobacco is harvested as an entire plant (stalk-cutting) based on average maturity of the entire plant. Extensive weed and pest control practices are carried out during the growing season.

The degree of sophistication and the level of mechanization utilized in conventional tobacco growing vary considerably across the globe. Each farmer's yield of conventional tobacco is highly variable as well, and is influenced by a combination of many factors such as weather conditions, tobacco type and style, crop management practices, varietal differences, pest and disease pressures, etc. The marketable yield (dry weight) per hectare of a farmer's conventional leaf tobacco crop can range from a few hundred kilos to more than 4,000 kilos, excluding complete crop failures.

Tobacco can also be grown as a biomass crop, as the tobacco plant has the ability to produce a large amount of biomass when grown in high plant populations, and when multiple harvests of the entire plant (stalks/stems and leaves) are carried out. Multiple harvests are achievable because tobacco can resprout or coppice from the remaining stalk stubble (stump) where new auxiliary buds (shoots or suckers) will develop from axils left on the stalk. This type of system has been utilized in protein extraction where the entire tobacco plant is harvested one or more times, and the plant protein is extracted from the fresh tobacco material. Fresh weight (wet weight) yields have been reported in excess of 100,000 kilos per hectare using a biomass tobacco growing system.

Biomass systems for growing tobacco to obtain large amounts of useful products have been explored as alternative (non-smoking) uses for tobacco. (Hanson et al., "Alternative Uses for Tobacco, MD" National Food and Agriculture (NIFA) Project No. MD-MAES-0630, project description available as USDA CRIS No. 207838 (2007)) Biomass production of tobacco has been tested for production and yield of a variety of useful products including proteins such as endogenous fraction-1 (F1) proteins or heterologous recombinantly produced proteins such as antibodies or vaccines, pigments such as xanthophyll, and secondary metabolites such as solanesol or nicotine, that are used in a variety of applications including livestock feed, poultry feed supplements, insecticides, production of coproducts for industrial uses, and for use in human food, medicine, and pharmaceuticals. Tobacco as a biomass crop has also been evaluated for energy production from tobacco plants and/or tobacco plant waste, e.g., for ethanol production from cellulose, or as feed for anaerobic digestion to produce biogas. (Todd, "Crops for Biomass and Small Molecule Production" presentation (2008); Arlen et al., "Field production and functional evaluation of chloroplast-derived interferon-α2b," *Plant Biotechnol J.* 5(4): 511-525 (2007)).

However, it is believed that the production of tobacco for use in manufactured tobacco products such as cigarettes, cigars, snus, snuff, chewing tobacco, reconstituted tobacco material, other uses of filler tobacco, etc., grown under an intensive biomass growing system, has not been extensively evaluated.

SUMMARY

According to some embodiments, a system for producing tobacco is provided, said system comprising: (a) direct seeding of tobacco seeds at a rate sufficient to produce a plant population density of at least 100,000 tobacco plants per acre after germination; (b) mechanically harvesting above-ground portions of the tobacco plants at least one time during a growing season to obtain harvested tobacco plant material comprising leaves attached to stalks, thereby obtaining a harvested tobacco plant material characterized by average stalks (stems) of between 2 to 60 inches, average green stalk (stem) thickness less than 1.5 inches, and an average of about 4 to 18 leaves per harvested plant; and (c) curing the harvested tobacco plant material comprising cured leaves attached to cured stalks to obtain a cured harvested tobacco plant material.

In some embodiments, the majority of the cured leaves have a cured midvein diameter of less than 11/32 of an inch and a majority of the cured stalks have a cured stalk thickness of less than 1.5 inches. In some embodiments, the majority of the cured leaves have a cured midvein diameter of less than 1/8 of an inch and a majority of the cured stalks have a cured stalk thickness of less than 0.5 inches. In some embodiments, the majority of the cured leaves have a cured midvein diameter of less than 3/32 of an inch and a majority of the cured stalks have a cured stalk thickness of less than 0.3 inches.

In some embodiments, the system further comprising mechanically threshing the cured harvested tobacco material comprising leaves attached to stalks and recovering the cured harvested tobacco material as threshed cured tobacco material comprising at least 50% lamina yield.

In some embodiments, the system comprises direct seeding of tobacco seeds at a rate sufficient to produce a plant population density of at least 500,000 tobacco plants per acre after germination. In some embodiments, the system comprises direct seeding of tobacco seeds at a rate sufficient to produce a plant population density of at least 750,000 tobacco plants per acre after germination. In some embodiments, the system comprises direct seeding of tobacco seeds at a rate sufficient to produce a plant population density of at least 1,500,000 tobacco plants per acre after germination.

In some embodiments, the system comprises direct seeding of tobacco at a rate sufficient to produce a plant population density of at least 2,250,000 tobacco plants per acre after germination.

In some embodiments, the system comprises at least one harvest during the growing season. In some embodiments, the system comprises two or more (e.g., 2, 3, 4, 5, etc) harvests during the growing season.

In some embodiments, the harvested tobacco plant material may be further characterized by having a reducing sugars to total alkaloids ratio (RS/TA ratio) in total cured leaf material of the cured harvested tobacco material of between about 5 to 35. In some embodiments, the harvested tobacco plant material may be further characterized by having a reducing sugars to total alkaloids ratio (RS/TA ratio) in total cured stalk material of the cured harvested tobacco material of between about 10 to 225. In some embodiments, the harvested tobacco plant material may be further characterized by having nicotine levels in total cured leaf material of the cured harvested tobacco material of between below detectable levels to about 5%. In some embodiments, the harvested tobacco plant material may be further characterized by having nicotine levels (measured as total alkaloids) in total cured stalk material of the cured harvested tobacco material of between below detectable levels to about 1%.

In some embodiments, the harvested tobacco plant material may be further characterized by having high leaf to stalk ratio of between 2:1 to 20:1.

According to some embodiments, cured harvested tobacco material is provided, said cured harvested tobacco material having leaves attached to stalks, wherein the cured leaves have a cured stem diameter of less than $11/32$ of a inch on average. In some embodiments, the cured stalks have a cured stalk thickness of less than 1.5 inches on average.

In some embodiments, the cured harvested tobacco material may be further characterized by having a RS/TA ratio in total cured leaf material of the cured harvested tobacco material of between about 5 to 35. In some embodiments, the cured harvested tobacco material may be further characterized by having a RS/TA ratio in total cured stalk material of the cured harvested tobacco material of between about 10 to 225. In some embodiments, the cured harvested tobacco material may be further characterized by having nicotine levels in total cured leaf material of the cured harvested tobacco material of between below detectable levels to about 5%. In some embodiments, the cured harvested tobacco material may be further characterized by having nicotine levels in total cured stalk material of the cured harvested tobacco material of between about 1% to below detectable levels. In some embodiments, the cured harvested tobacco material may be further characterized by having levels of reducing sugars in total cured leaf material of the cured harvested tobacco material between below detectable levels to about 20%. In some embodiments, the cured harvested tobacco material may be further characterized by having levels of reducing sugars in total cured stalk material of the cured harvested tobacco material between below detectable levels to about 20%. In some embodiments, the cured harvested tobacco material produces a lamina yield of greater then 50% when threshed.

According to some embodiments, cured harvested tobacco material is provided, said cured harvested tobacco material characterized by having a tobacco material that has a leaf to stalk ratio of between 2:1 to 20:1.

According to some embodiments, a system for producing tobacco is provided comprising: (a) direct seeding of tobacco seeds at a rate sufficient to produce a plant population density of at least 100,000 tobacco plants per acre after germination; (b) mechanically harvesting above-ground portions of the tobacco plants at least one time during a growing season to obtain harvested tobacco plant material comprising leaves attached to stalks, thereby obtaining a harvested tobacco plant material characterized by average shorter stalks (stems) of between about 2 to 36 inches (e.g. between about 2 to 24 inches), average green stalk (stem) thickness between about 0.1 to 1 inch (e.g., between about 0.1 to 0.5 inches), and an average of about 4 to 20 leaves per harvested plant (including 4, 5, 6, 7 or 8 leaves per harvested plant); and (c) curing the harvested tobacco plant material comprising cured leaves attached to cured stalks to obtain a cured harvested tobacco plant material.

In some embodiments, at least a majority (e.g., at least 50%, at least 60%, at least 70%, at least 75%, at least 80%, at least 85%, at least 90%, or at least 95%) of the cured leaves have a cured midvein diameter of less than $5/32$ of an inch (e.g., less than $4/32$ in., less than $5/32$ in.) and at least a majority (e.g., at least 50%, at least 60%, at least 70%, at least 75%, at least 80%, at least 85%, at least 90%, or at least 95%) of the cured stalks have a cured stalk thickness of less than 0.8 inches (e.g., less than 0.5 inches or less than 0.3 inches). In some embodiments, at least a majority of the cured leaves have a cured midvein diameter of less than $1/8$ of an inch and a majority of the cured stalks have a cured stalk thickness of less than 0.5 inches.

In some embodiments, the stem length may be between about 2 to 60 inches, including between about 2 to 24 inches, about 2 to 48 inches, about 2 to 36 inches, about 2 to 20 inches, about 20 to 40 inches, 2 to 18 inches, 2 to 15 inches, 2 to 12 inches, 2 to 10 inches, 2 to 9 inches, 2 to 8 inches, 2 to 6 inches, 2 to 5 inches, 2 to 4 inches, 10 to 15 inches, 5 to 10 inches, 15 to 20 inches, and about 20 to 24 inches.

In some embodiments, the system may further comprise mechanically threshing the cured harvested tobacco material comprising leaves attached to stalks, and recovering at least a majority (e.g., at least 55%, at least 60%, at least 70%, at least 75%, at least 80%, at least 85%, at least 90%, or at least 95%) of the cured harvested tobacco material as threshed cured tobacco material comprising at least 50% lamina yield.

In some embodiments, the system may comprise direct seeding of tobacco seeds at a rate sufficient to produce a plant population density of at least 750,000, at least 1,500,000, or at least 2,250,000 tobacco plants per acre after germination.

In some embodiments, the system may comprise two, three, four or more harvests during the growing season.

In some embodiments, the harvested tobacco plant material is further characterized by having a reducing sugars to total alkaloids ratio (RS/TA ratio) in total cured leaf material of the cured harvested tobacco material of between about 18 to 25, between about 10 to 50, or between about 15 to 75.

In some embodiments, the harvested tobacco plant material is further characterized by having a reducing sugars to total alkaloids ratio (RS/TA ratio) in total cured stalk material of the cured harvested tobacco material of between about 40 to 165, between about 20 to 200, or between about 80 to 120.

In some embodiments, the harvested tobacco plant material is further characterized by having nicotine levels (measured as total alkaloids) in total cured leaf material of the cured harvested tobacco material of between about 0.2% to about 5% (e.g., about 0.2% to about 3%, about 0.2% to about 2%, about 0.2% to about 1.5%, about 0.2% to about 1%, about 0.2% to about 0.6%, between about 0.2% to about 0.5%, between about 0.3% to about 0.6%, or between about 0.3% to about 0.6%).

In some embodiments, the harvested tobacco plant material is further characterized by having nicotine levels (measured as total alkaloids) in total cured stalk material of the cured harvested tobacco material of between about 3% to below detectable levels (e.g., less than about 2%, less than about 1%, less than about 0.5%, or less than about 0.3%).

In some embodiments, the harvested tobacco plant material is further characterized by having a high leaf to stalk ratio of between 3:1 to 10:1, between 2:1 to 20:1, or between 3:1 to 30:1.

According to some embodiments, a cured harvested tobacco material is provided that is characterized by having a cured stalk length of between about 2 and about 15 inches, a cured stalk thickness of less than 0.25 inches, and 4 to 8 leaves per cured plant.

According to some embodiments, a cured harvested tobacco material is provided characterized by having a cured stalk length of between about 2 and about 24 inches, a cured stalk thickness of less than 0.5 inches, and 4 to 12 leaves per cured plant.

According to some embodiments, there is provided a cured harvested tobacco material with leaves attached to stalks, wherein cured leaves have a cured stem diameter (cured midvein diameter) of less than 3/32 of a inch. In some embodiments, the cured stalks have a cured stalk thickness of less than 0.3 inches on average. In some embodiments, the cured harvested tobacco material may be further characterized as having one or more of the following properties:

a RS/TA ratio in total cured leaf material of the cured harvested tobacco material of between about 18 to 25;

a RS/TA ratio in total cured stalk material of the cured harvested tobacco material of between about 40 to 165;

nicotine levels (measured as total alkaloids) in total cured leaf material of the cured harvested tobacco material of between about 0.2% to about 0.6% (e.g., between about 0.2% to about 0.5%, between about 0.3% to about 0.6%, or between about 0.3% to about 0.6%);

nicotine levels (measured as total alkaloids) in total cured stalk material of the cured harvested tobacco material of between about 0.3% to below detectable levels;

levels of reducing sugars in total cured leaf material of the cured harvested tobacco material between about 6 to 10%;

levels of reducing sugars in total cured stalk material of the cured harvested tobacco material between about 12 to 15%; and/or:

a high leaf to stalk ratio of between 3:1 to 10:1.

Several additional aspects, attributes and inventions will be appreciated from the disclosure below.

DETAILED DESCRIPTION

Among other things, the present disclosure provides a system for producing useable tobacco material having chemical and physical properties acceptable to tobacco industry stakeholders, by growing tobacco in a directly seeded system, under an intensive biomass growing system, mechanically harvesting above-ground portions of the plant one time or a plurality of times during the growing season, curing tobacco leaves and stalks together, and processing the cured tobacco material to obtain cured leaf material suitable for use in tobacco products including, but not limited to, cigarettes, cigars, snus, snuff, chewing tobacco, pipe tobacco, reconstituted tobacco material, and other manufactured tobacco products.

In some embodiments, a tobacco production system is provided having the steps of directly seeding of tobacco seeds at a rate sufficient to produce a plant population density of at least 100,000 tobacco plants per acre after germination, mechanically harvesting above-ground portions of the tobacco plants a plurality of times during the growing season to obtain harvested tobacco plant material containing leaves attached to stalks wherein the harvested tobacco plant material has a higher leaf to stem ratio than conventionally grown tobacco plant material, curing the harvested tobacco plant material containing leaves attached to stalks, mechanically threshing the cured harvested tobacco material containing leaves attached to stalks, and recovering the cured harvested tobacco material as threshed cured tobacco material comprising at least 50% lamina yield.

The present disclosure also provides a system for producing useable tobacco material having chemical and physical properties acceptable to tobacco industry stakeholders, in a low-cost manner, by growing tobacco in a directly seeded system, under an intensive biomass growing system, mechanically harvesting at least 50% (e.g., at least 55%, at least 60%, at least 70%, at least 75%, at least 80%, at least 85%, at least 90%, or at least 95%) of the entire above-ground portion of the plant one time or a plurality of times during the growing season, curing tobacco leaves and stalks together, and processing the cured tobacco material to obtain a low-cost cured leaf material suitable for use in tobacco products. The present disclosure also provides a system that can be referred to as a low-cost tobacco production system or an experimental low-cost tobacco production system.

The present disclosure also provides a system for producing useable tobacco material having chemical and physical properties acceptable to tobacco industry stakeholders, in a low-cost manner, by growing tobacco in a directly seeded system, under an intensive biomass growing system, mechanically harvesting at least 50% (e.g., at least 55%, at least 60%, at least 70%, at least 75%, at least 80%, at least 85%, at least 90%, or at least 95%) of the entire above-ground portion of the plant one time or a plurality of times during the growing season, curing tobacco leaves and stalks together, and processing the cured tobacco material to obtain a cured leaf material suitable for use in tobacco products, with higher total yields (in kg/ha or lbs/acre), lower production costs per product weight ($/kg or $/lb), lower labor requirements (man-days/ha or man-days/acre), and higher lamina yield (kg/ha or lbs/acre) compared with conventional tobacco production systems.

The present disclosure also provides a system for producing useable tobacco material having chemical and physical properties acceptable to tobacco industry stakeholders using an intensive biomass growing system to produce cured leaf material suitable for use in tobacco products. An intensive biomass growing system for the production of tobacco for use in manufactured tobacco products has not been used previously.

The present disclosure also provides a system for evaluating the commercial acceptability of an intensive biomass growing system for the production of tobacco for use in manufactured tobacco products. An intensive biomass growing system for the production of tobacco for use in manufactured tobacco products has not been evaluated previously.

The present disclosure also provides a system for producing harvested tobacco material suitable for curing stalks and leaves together, wherein said harvested tobacco material has a higher leaf to stalk ratio than the average leaf to stalk ratio of conventionally grown tobacco, and said harvested tobacco material has an average green stalk thickness that is substantially smaller than the average green stalk thickness of conventionally grown tobacco. According to some embodiments, the leaf to stalk ratio is determined by the following: (Avg. Leaf Area)/(Stem Length×Stem Thickness) and may be at least 3:1 to 20:1, including 3:1 to 20:1, 4:1 to 20:1, 5:1 to 20:1, 6:1 to 20:1, 7:1 to 20:1, 8:1 to 20:1, 9:1 to 10:1, 11:1 to 12:1, 4:1 to 12:1, 5:1 to 12:1, 6:1 to 12:1, 7:1 to 12:1, 8:1 to 12:1, 9:1 to 12:1, 3:1 to 10:1, 4:1 to 1:10, 5:1 to 1:10, 6:1 to 1:10, 7:1 to 1:10, 8:1 to 1:10, 9:1 to 1:10, 3:1 to 8:1, 3:1 to 7:1, 3:1 to 6:1, or 4:1 to 6:1.

The leaf to stalk ratio is preferably determined using the cured leaf area ($cm^2$) and cured stem dimensions (cm). In some embodiments, the leaf to stalk ratio is determined using the green leaf area ($cm^2$) and green stem dimensions (cm).

The stem length may be measured using standard ruler or steel tape, measuring from stem end to stem end, starting from the terminal cut or detached stem end to the terminal end of the stem or leaf tip of green and/or cured leaf and/or stem, as appropriate. Using this method, the stem and/or leaf is laid flat and straightened as needed to provide for an accurate stem length measurement. Stem thickness is determined by measuring base stem diameters with calipers 0.25 to 0.5 inch above the cut of green and/or cured stems, as appropriate.

Leaf Area may be calculated by the following formula: Leaf Area=0.703×Leaf Length×Leaf Width. The constant 0.703 is used for immature, more oval-shaped tobacco leaves compared to 0.634 for mature, more elongated leaves. See Suggs et al., Tob. Sci.: 194 (1960), incorporated herein by reference in its entirety.

The present disclosure also provides a system for producing a cured harvested tobacco material comprising leaves attached to stalks, wherein said cured harvested tobacco material has a cured stalk thickness that is substantially smaller than the average cured stalk thickness of conventionally grown tobacco.

The present disclosure also provides a system for producing a cured harvested tobacco material with lower levels of alkaloids and reducing sugars compared with the levels of conventionally grown cured tobacco, said cured harvested tobacco material comprising leaves attached to stalks.

The present disclosure also provides a system for producing useable tobacco material having chemical and physical properties acceptable to tobacco industry stakeholders by threshing cured harvested tobacco material comprising leaves attached to stalks, and recovering at least 50% (e.g., at least 55%, at least 60%, at least 70%, at least 75%, at least 80%, at least 85%, at least 90%, or at least 95%) of the cured harvested tobacco material as threshed tobacco material comprising at least 50% lamina yield (e.g., at least 55%, at least 60%, at least 65%, at least 70%, at least 75%, at least 80%, at least 85%, at least 90%, at least 95% lamina yield).

The present disclosure also provides a system for using close-grown tobacco leaves and stalks produced using an intensive biomass growing system, which were harvested and cured together, to produce cured leaf material suitable for use in tobacco products. In a non-limiting exemplary embodiment, an experiment was conducted in eastern North Carolina on a large commercial tobacco farm that provided access to certain production and curing expertise, equipment, labor and irrigation capabilities to practice and evaluate multiple non-limiting embodiments of the tobacco production system provided herein.

The present disclosure also provides a system for producing a cured leaf yield of at least 6000 lbs per acre of tobacco material having chemical and physical properties acceptable to tobacco industry stakeholders, by growing tobacco entirely in a directly seeded system, under an intensive biomass growing system, mechanically harvesting aboveground portions of the plant one time or a plurality of times during the growing season, wherein the harvested tobacco material has small leaves and thin stalks with a high leaf to stalk ratio, curing tobacco leaves and stalks together, and processing the cured tobacco material to obtain cured leaf material suitable for use in tobacco products including, but not limited to, cigarettes, cigars, snus, snuff, chewing tobacco, pipe tobacco, and other manufactured tobacco products.

The present disclosure also provides cured leaf material suitable for use in tobacco products, produced by the tobacco production systems, and methods disclosed herein.

Direct Seeding and Intensive Biomass Growing System

In accordance with one aspect of the present tobacco production system, tobacco seeds are directly seeded into prepared soil, at a rate determined to give an acceptably high plant population density after germination. Accordingly, the present disclosure provides a tobacco production system that does not require separate steps of seeding, germination, and transplantation of tobacco seedlings to a final location for growth of the tobacco plant. In various non-limiting embodiments, tobacco seeds can be directly seeded as described in the Examples below. Suitable soil preparation, seeding conditions, seeding methods, seed treatments, usw., for practicing the present embodiments can be determined by a person of skill in the art, in view of factors including but not limited to the tobacco variety (cultivar) being used, local soil and climatic conditions, and other relevant agronomic factors.

In accordance with one aspect of the present system, tobacco seeds are directly seeded into prepared soil, at a rate determined to give an acceptably high plant population density after germination. As illustrated in the non-limiting exemplary embodiments in the Examples below, seeds can be sown (directly seeded) at rates of 17 seeds per square foot; 34 seeds per square foot; and 51 seeds per square foot. A wide range of seeding rates for direct seeding can be practiced in accordance with the present disclosure, including but not limited to: between about 1-5 seeds per square foot; between about 5-10 seeds per square foot; between about 10-15 seeds per square foot; between about 15-20 seeds per square foot; between about 20-25 seeds per square foot; between about 25-30 seeds per square foot; between about 30-35 seeds per square foot; between about 35-40 seeds per square foot; between about 40-45 seeds per square foot; between about 45-50 seeds per square foot; between about 50-55 seeds per square foot; between about 55-60 seeds per square foot; between about 60-65 seeds per square foot; between about 65-70 seeds per square foot; between about 70-75 seeds per square foot; between about 75-80 seeds per square foot; between about 80-85 seeds per square foot; between about 85-90 seeds per square foot; between about 90-95 seeds per square foot; between about 95-100 seeds per square foot; or greater than 100 seeds per square foot. Suitable seeding rates can be determined by a person of skill in the art in view of factors including but not limited to the tobacco variety (cultivar) being used, local soil and climatic conditions, and other relevant agronomic factors.

In accordance with another aspect of the disclosure, directly seeded tobacco seeds germinate and produce acceptably high plant population densities for producing useable tobacco material having chemical and physical properties acceptable to tobacco industry stakeholders using an intensive biomass growing system. Accordingly, the present disclosure provides a tobacco production system that involves growing plants at population densities above the average density of about 6,000 plants per acre in conventional tobacco production systems. It is understood that the germination rate of directly seeded tobacco seeds may be less than 100%, and seeding densities may be adjusted for potential incomplete germination in order to yield an acceptable plant population density for tobacco production using an intensive biomass growing system. As illustrated in the non-limiting exemplary embodiments in the Examples below, the present system can be practiced using plant population densities of 750,000 plants per acre, 1,500,000 plants per acre, and 2,250,000 plants per acre. A wide range of population densities can be practiced in accordance with the present disclosure, including but not limited to: between about 10,000-50,000 plants per acre; between about 50,000-100,000 plants per acre; between about 100,000-500,000 plants per acre; between about 500,000-1,000,000 plants per acre; between about 1,000,000-1,500,000 plants per acre; between about 1,500,000-2,000,000 plants per acre; between about 2,000,000-2,500,000 plants per acre; between about 2,000,000-3,000,000 plants per acre; between about 3,000,000-3,500,000 plants per acre; between about 3,500,000-4,000,000 plants per acre; and greater than about 4,000,000 plants per acre. Suitable population densities can be determined by a person of skill in the art in view of factors including but not limited to the tobacco variety (cultivar) being used, local soil and climatic conditions, and other relevant agronomic factors.

Harvesting of Stalks and Leaves

In accordance with one aspect of the present disclosure, directly seeded tobacco grown under an intensive biomass growing system is mechanically harvested one time or a plurality of times (e.g., 2, 3, 4, 5, 6, 7, 8, or more times) during the growing season, wherein the harvesting includes harvesting above-ground portions of the tobacco plants and obtaining harvested tobacco material comprising leaves attached to stalks. The term "harvesting above-ground portions of the tobacco plants" as used herein means that the harvester is set to cut at a level that is at least above the average location of the lowest axil of the plants when a further harvest is planned, in order to permit the plant to re-sprout or coppice from at least one remaining axil in the remaining stump, supported by photosynthetic material to produce stalk and leaf material for the next harvest. Harvesting above-ground portions of the tobacco plants may be determined on the basis of the average location of the lowest axils in the population of plants to be harvested. The lowest axil of each plant may be at a different location and thus some plants may be cut below the lowest axil or have insufficient remaining photosynthetic material, such that regrowth may not occur. Alternatively, some plants may contain multiple lower axils to support re-sprouting of the plant after harvesting at a level that is above the average location of the lowest axil of at least a majority (e.g., at least 50%, at least 60%, at least 70%, at least 75%, at least 80%, at least 85%, at least 90%, or at least 95%) of plants.

Cutting heights may be adjusted such that insufficient regrowth rarely occurs. Suitable cutting heights for any harvest include but are not limited to: about 0.5-1 inch above soil level; about 1-2 inches above soil level; about 2-3 inches above soil level; about 3-4 inches above soil level; about 4-5 inches above soil level; about 5-6 inches above soil level; about 6-7 inches above soil level; about 7-8 inches above soil level; about 8-9 inches above soil level; about 9-10 inches above soil level; about 10-11 inches above soil level; about 11-12 inches above soil level; about 12-13 inches above soil level; about 13-14 inches above soil level; about 14-15 inches above soil level; about 15-16 inches above soil level; about 16-17 inches above soil level; about 17-18 inches above soil level; about 18-19 inches above soil level; about 19-20 inches above soil level; about 20 to 24 inches above soil level; or about 24 to 36 inches above soil level.

Although the final harvest of the growing season does not need to cut above the lowest axil or leave sufficient photosynthetic material because no further growth is required, the cutting height of the final harvest may be higher than for previous harvests in order to avoid hardened stems left from previous harvests. Accordingly, the present disclosure provides a tobacco production system with mechanical harvesting that does not require steps of manual topping, manual harvesting, and other manual manipulations of the plant during the growing season.

The present disclosure provides mechanically harvesting the plant one time or a plurality of times during the growing season and obtaining harvested tobacco material comprising leaves attached to stalks. Likewise, the present disclosure provides mechanically harvesting a seedbed or field directly seeded with tobacco at a desired density, one time or a plurality of times during the growing season and obtaining harvested tobacco material comprising leaves attached to stalks. The term "plurality" as used herein means at least two (2) harvests during the growing season, and includes three (3) harvests, four (4) harvests, five (5) harvests, or more than five harvests during the growing season. For each harvest, the harvesting machinery will be set to obtain the desired stalk and leaf material available for that harvest, where the cutting height may be selected on the basis of factors including but not limited to average plant architecture in the plant population to be harvested, average location of lower axils in plants of the plant population to be harvested, relative amounts of stalk and leaf that will be obtained, correlation between average leaf location and leaf quality in plants of the plant population to be harvested, correlation between midvein size and leaf size/quality with location (height) in plants of the plant population to be harvested, relative amounts of desirable leaf material and undesirable stalk material available at each cutting height, mechanical factors, and other factors to be determined by a person of skill in the art. As noted above, for harvests when a further harvest is planned, the harvesting machinery should be set to cut the tobacco plants at a level that will permit re-sprouting or coppicing from one or more axils in the remaining stump, to produce stalk and leaf material for the next harvest, whereas the final harvest does not require leaving intact axils but should consider plant architecture, yield, and quality as discussed above to determine the optimal cutting height. The present system may be practiced using the same cutting height for all harvests, or cutting heights may be determined separately for each harvest.

As illustrated in the non-limiting exemplary embodiments in the Examples below, the present system can be practiced using three (3) harvests during the growing season. In particular, the Examples disclose non-limiting embodiments of harvests at 90 days, 131 days, and 195 days after seeding. As further illustrated in the non-limiting exemplary embodiments in the Examples below, the present system may be practiced using three (3) harvests during the growing season, where the cutting height is separately determined for each harvest, where the first harvest was carried out with the cutting bar set to approximately 5-7 inches above soil level (above ground) and the cutting height was increased another 1-2 inches for each of the next two harvests, i.e., the cutting bar for the second harvest was set to approximately 6-9 inches above soil level, and the cutting bar for the third harvest was set to approximately 7-11 inches above soil level. Without wishing to be limited by this theory, setting the cutting bar higher for each consecutive harvest reduces the content of hardened stems in the harvested tobacco material.

Directly seeded tobacco grown under an intensive biomass growing system as presently disclosed can be manually harvested one time or a plurality of times during the growing season, wherein the harvesting includes harvesting sufficient above-ground portions of the tobacco plants, and obtaining harvested tobacco material comprising leaves attached to stalks. Without wishing to be limited by this theory, it is understood that mechanical harvesting of the above-ground portions of the tobacco plants grown under the intensive biomass growing system as presently disclosed could be a factor in making the presently disclosed tobacco production system more cost-effective than conventional tobacco production systems, but it is likewise understood that nothing in the present disclosure precludes manual harvesting of the above-ground portions of the tobacco plants.

Harvested Tobacco Material

Harvested tobacco material produced according to the presently disclosed system has characteristics that are distinct from conventionally produced tobacco plants or harvested material from conventionally produced tobacco plants. Harvested tobacco material produced according to the presently disclosed system has a distinct plant architecture (as compared to plants harvested using conventional methods) with small leaves and short, thin stalks, and a high ratio of leaf to stalk, such that substantially all (e.g., at least 55%, at least 60%, at least 70%, at least 75%, at least 80%, at least 85%, at least 90%, or at least 95%) of the harvested tobacco material is suitable for curing and threshing to yield cured tobacco material acceptable for use in tobacco products. The harvested tobacco material is "leafy" with small leaves and has thin stalks, and the entire harvested leaf and stalk is used to prepare cured harvested tobacco material, and substantially all (e.g., at least 55%, at least 60%, at least 70%, at least 75%, at least 80%, at least 85%, at least 90%, or at least 95%) of the cured harvested tobacco material, is suitable for threshing to yield threshed cured tobacco material acceptable for use in tobacco products. The distinctive plant architecture of harvested tobacco material enabling at least 50% (e.g., at least 55%, at least 60%, at least 70%, at least 75%, at least 80%, at least 85%, at least 90%, or at least 95%) of the harvested tobacco material to be turned into cured threshed harvested tobacco material to be used in tobacco products, is referred to as "a high leaf to stalk ratio" such as, for example, a leaf to stalk ratio of between about 2:1 to about 20:1, between about 3:1 to about 20:1, between about 3:1 to about 10:1, between about 4:1 to about 8:1, or between about 4:1 to about 6:1.

It is understood that one or more of the distinct characteristics of the harvested tobacco material has an important role in the presently disclosed tobacco production system to enable aspects of the system including, but not limited to, cost-effectiveness, reduced labor use, lower nicotine content, lower processing costs, reduced processing steps, higher yield per unit land area, and other aspects.

Conventionally produced tobacco plants at harvest have a plant height of about 3-5 feet for stalk-cut plants (e.g., stalk-cut Burley), with a stalk thickness of about 2½ to 3 inches at the cut line, average green stalk thickness of about 1½ to 2 inches, and about 16-26 leaves per plant, e.g., as shown in Table 9 (below) for the five more popular flue-cured tobacco (FCV) cultivars in the United States, although it should be noted that flue-cured tobacco cultivars are usually not stalk-cut.

In some embodiments, harvested tobacco material produced according to one embodiment of presently disclosed system is characterized by shorter stalks (stems) of between about 2 to 24 inches, green stalk (stem) thickness between about 0.1 to 0.5 inches, and about 4 to 8 leaves per harvested plant.

In some embodiments, harvested tobacco material produced according to one embodiment of the presently disclosed system is characterized by shorter stalks (stems) of between about 24 to 60 inches, green stalk (stem) thickness between about 0.6 to 1.5 inches, and about 9 to 18 leaves per harvested plant.

However, a person of ordinary skill in the art can appreciate that the ranges provided above for stalks (stem) may be greater or lesser due to natural variations and growing techniques. For example, the tobacco material produced under the disclosed system will appear physically, and chemically, different from conventionally flue-cured tobacco grown in Eastern NC. In conventional flue-cured tobacco stalk height (length) ranges from 30 inches to 47 inches for topped tobacco, with an average about 37 inches. This is measured from the soil surface to the cut end of the stalk. Some areas do not top their flue-cured tobacco (or other types) so a plant can grow much taller. For example, flue-cured can grow 5 feet to more than 10 feet, depending upon the variety. Some varieties may grow even taller. The measurements provided above for maximum heights are based on "normal" production practices and no topping. That is, growth is started from direct seed at a very high population, the plants are not topped, and the entire plant is harvested and cured, all of which are different from conventional US flue-cured tobacco production practices.

Thus, harvested tobacco material produced according to one embodiment of the presently disclosed system is characterized by shorter stalks (stems) of between about 2 to 60 inches (e.g., 2 to 24 inches or 2 to 36 inches), average green stalk (stem) thickness between about 0.1 to 1.5 inches (e.g., about 0.1 to 0.3 inch, about 0.1 to 0.5 inch or about 0.1 to 1 inch), and about 4 to 20 leaves per harvested plant (e.g., about 4 to 10 leaves per harvested plant, about 4 to 12 leaves per harvested plant, about 4 to 18 leaves per harvested plant, or about 9 to 18 leaves per harvested plant).

Typical values for harvested tobacco material produced according to the presently disclosed system are shown in the non-limiting exemplary embodiment in the Examples below, where the stem/stalk length, i.e., the above-ground portion of the plant that was harvested, was between 2.83 to 12.3 inches, green stalk thickness was between 0.243 to 0.357 inches, and the number of leaves in the above-ground portion of the plant that was harvested was between 5.42 to 7.48 leaves per plant (see, Tables 1-3).

The harvested tobacco material produced according to the presently disclosed system includes leaves that are substantially smaller than the harvested leaves of conventionally produced tobacco. In particular, the harvested tobacco material produced according to the presently disclosed system contains a majority of leaves that are sufficiently small such that the majority of cured leaves will have a cured stem diameter (cured midvein diameter) of less than $3/32$ of a inch, where a cured midvein of less than $3/32$ of a inch does not have to be removed.

Thus, harvested tobacco material produced according to the presently disclosed system is characterized by shorter and thinner stalks with a substantial number of leaves per plant, and smaller leaves where the harvested tobacco material has a high leaf to stalk ratio, such that at least 50% (e.g., at least 55%, at least 60%, at least 70%, at least 75%, at least 80%, at least 85%, at least 90%, or at least 95%) of the leaves and stalks of the harvested material are suitable for curing and threshing, and substantially all (e.g., greater than 70%, greater than 75%, greater than 80%, greater than 85%, greater than 90%, greater than 95%, greater than 97%, or greater than 99%) of the harvested tobacco is used in tobacco products after curing, threshing, and other processing.

Curing Stalks and Leaves Together

In accordance with one aspect of the present disclosure, directly seeded tobacco plants grown under an intensive biomass growing system are harvested to provide harvested tobacco plant material containing leaves attached to stalks, the harvested tobacco plant material is cured, i.e., the harvested leaves and stalks are cured together, and the cured tobacco plant material is mechanically threshed and processed to obtain cured leaf material suitable for use in tobacco. Accordingly, the present disclosure provides a tobacco production system that does not require manual labor such as leaf harvesting or handstripping found in conventional tobacco production systems. In some embodiments, the stalk material is not removed and cured together with leaf material.

In accordance with one aspect of the present disclosure, the harvested tobacco plant material containing leaves attached to stalks produced according to the presently disclosed tobacco production system is cured according to the tobacco variety and the intended use of the cured leaf material. Suitable curing conditions, e.g., air-curing, fire-curing, flue-curing, or sun-curing, and details thereof, for a particular embodiment can be determined by a skilled person relying on available knowledge. Accordingly, the present disclosure provides a tobacco production system wherein stalks and leaves are cured together, and the presently disclosed system does not require separation of leaves from stalks prior to curing, as is required in some conventional tobacco production systems. In contrast, in conventional Flue-Cured Virginia (FCV) production systems, leaves are removed (stripped) from the stalk prior to curing and only the FCV leaf material is cured. In some conventional Burley type production systems, leaves are removed (stripped) from the stalk prior to curing and only the Burley leaf material is cured, whereas in other Burley type production systems, stalk-cut Burley (obtained by cutting the stalk to obtain harvested tobacco material comprising leaves attached to stalks) is cured and the cured Burley leaves are then removed from the stalk prior to threshing or other processing.

As illustrated in the non-limiting exemplary embodiments in the Examples and Tables 4-7 below, harvested tobacco plant material of the flue-cured variety GL 26H produced according to the presently disclosed production system can be flue-cured, with stalks and leaves flue-cured together, yielding tobacco material of an acceptable quality. As further illustrated in the non-limiting exemplary embodiments in the Examples below, harvested tobacco plant material of the flue-cured variety GL 26H can be air-cured, with stalks and leaves air-cured together, to yield tobacco material of an acceptable quality. Harvested tobacco plant material of the flue-cured variety GL 26H produced according to the presently disclosed production system can be air-cured, sun-cured, or flue-cured, with stalks and leaves cured together. As noted herein, the harvested tobacco material is "leafy" with small leaves and has thin stalks, such that after curing at least 50% (e.g., at least 55%, at least 60%, at least 70%, at least 75%, at least 80%, at least 85%, at least 90%, or at least 95%) of the harvested tobacco material is suitable for threshing and/or other processing to tobacco material acceptable for use in tobacco product.

As noted herein, the harvested tobacco material with leaves attached to stalks, has thin, non-woody stalks (stems) that are acceptable for use in tobacco products after curing and threshing. The stalks show a dramatic reduction in stalk thickness as a result of curing. Without wishing to be limited by this theory, the cured stalks of the cured harvested tobacco material produced according to the presently disclosed production system are thin enough and do not have objectionable characteristics such as woodiness, such that a significant portion of the cured stalk material can be retained in the final cured threshed material suitable for use in tobacco products, thereby providing a higher total level of utilization of the tobacco material produced by the presently disclosed system. As shown in the non-limiting exemplary embodiment in the Examples below, stalks showed a reduction of between 28.0-34.7% for first harvest material and a reduction of between 30-38.5% for the second harvest material, yielding cured stalk thickness of between 0.187 to 0.229 inches (see, Tables 1-3).

As noted herein, the harvested tobacco material with leaves attached to stalks includes leaves that are substantially smaller than the harvested leaves of conventionally produced tobacco. Accordingly, the majority of cured leaves in the cured harvested tobacco material will have a cured stem diameter (cured midvein diameter) of less than 3/32 of an inch, where a cured midvein of less than 3/32 of an inch does not have to be removed.

Chemistry of Cured Harvested Tobacco Material

Cured harvested tobacco material produced according to the presently disclosed production system has a distinct chemistry compared with the chemistry of conventionally produced cured tobacco material. Briefly, the cured harvested tobacco material has lower total alkaloids, in particular lower nicotine levels, and lower levels of reducing sugars, but higher ratios of reducing sugar to total alkaloids (RS/TA ratios). The concentrations of TSNAs (tobacco specific nitrosamines) were low and below the detection limit.

In some embodiments, nicotine levels (measured as total alkaloids) in total cured leaf material of the cured harvested tobacco material may be between about 0.1% to about 2.5%, between about 0.2% to about 1.5%, between about 0.2% to about 1% or between about 0.12% to about 0.5%. Nicotine levels in total cured stalk material may be between about 2% to below detectable levels, for example, less than about 1%, less than about 0.5% or less than about 0.3%. In the same sample of cured harvested tobacco material, nicotine levels in the leaf material are higher than nicotine levels in the stalk material.

Cured harvested tobacco material produced according to the presently disclosed production system has lower reducing sugars than conventionally produced tobacco material. In some embodiments, levels of reducing sugars in total cured leaf material of the cured harvested tobacco material are between about 4 to 20%, between about 6 to 15%, between about 6 to 10% or between about 4 to 10%. In some embodiments, levels of reducing sugars in total cured stalk material is between about 5 to 30%, between about 10 to 30%, between about 5 to 20%, between about 5 to 15%, between about 8 to 15% or between about 10 to 20%.

In some embodiments, levels of reducing sugars in total cured leaf material of the cured harvested tobacco material are between about 6 to 10%, and levels of reducing sugars in total cured stalk material is between about 12 to 15%.

In the same sample of cured harvested tobacco material, levels of reducing sugars in the leaf material are lower than levels of reducing sugars in the stalk material. When cured harvested tobacco material produced according to the presently disclosed production system was "hand stemmed" or "hand stripped" to obtain lamina, the strip chemistry also showed levels of reducing sugars of about 14.5%.

Cured harvested tobacco material produced according to the presently disclosed production system has higher ratios of reducing sugars to total alkaloids (RS/TA ratios) than the ratios calculated for conventionally produced tobacco. It is understood that RS/TA ratios can be used as an indication of quality, where a ratio greater than 3.0 is generally considered to indicate acceptable quality. In some embodiments, the RS/TA ratios in total cured leaf material of the cured harvested tobacco material are between about 3 to 50, between about 5 to 25, between about 10 to 25, between about 15 to 50, or between about 18 to 25, In some embodiments, the RS/TA ratios in total cured stalk material are between about 3 to 165, between about 10 to 165, between about 40 to 165, between about 3 to 80, between about 10 to 80, between about 40 to 80, between about 40 to 120 or between about 40 to 100.

In the same sample of cured harvested tobacco material, stalks contained slightly higher reducing sugar concentrations than leaves but substantially lower total alkaloid concentrations than leaves, resulting in very high RS/TA ratios. When cured harvested tobacco material produced according to the presently disclosed production system was "hand stemmed" or "hand stripped" to obtain lamina, the strip chemistry showed RS/TA ratios in the expected range, with a ratio of 17.3 in a non-limiting exemplary embodiment. For purposes of comparison, RS/TA ratios for five popular flue-cured tobacco (FCV) cultivars in the United States are between 4.55 to 5.24, as shown in Table 9.

A person of ordinary skill in the art can appreciate that nicotine levels are influenced by multiple interconnected and interactive factors, such as genetics, fertility, crop management, environmental conditions, etc., and thus the ranges presented above are provided as guidance. Using a different variety could produce tobacco material outside the described ranges observed in the disclosed system. Plant genetics are the primary precursor for nicotine formation within a plant, therefore a different set of genes (cultivar/variety) can produce higher or lower levels of nicotine utilizing the disclosed system. Likewise the reducing sugar levels are also influenced by multiple interconnected and interactive factors, such as genetics, fertility, crop management, environmental conditions, curing conditions, etc., so it is possible to produce tobacco material outside the described ranges observed in the disclosed system. Equivalent results can be found with a comparison between the ranges found in tobacco material grown using conventional techniques to the ranges observed in like tobacco material grown using the presently disclosed system.

Processing/Threshing

In accordance with one aspect of the present disclosure, cured harvested tobacco plant material containing stalks and leaves cured together, can be mechanically processed by threshing to yield tobacco material of an acceptable quality, having at least 50% lamina yield (e.g., at least 55%, at least 60%, at least 65%, at least 70%, at least 75%, at least 80%, at least 85%, at least 90%, at least 95% lamina yield). As provided herein, the cured harvested tobacco plant material is mechanically threshed to substantially remove leaf material from plant stalk material and minimize the content of residual stalk material in the packed/finished product. It is understood that threshing of the cured harvested tobacco plant material produced in accordance with the presently disclosed system is different from conventional whole leaf threshing, as the cured harvested tobacco plant material consists essentially of leaves attached to stalks/stems, whereas conventional whole leaf threshing usually consists of threshing only leaves that have been removed from stalks, and more commonly, threshing leaf lamina produced by removing (stripping) the midvein (stem) from the leaf, removing and discarding non-tobacco related material (NTRM), such as grass, sand, etc., as well as addition of steam and water (mist) before threshing, and sometimes during threshing, and a drying (redrying) phase to lower moisture to a suitable level after threshing and before packing/prizing. Accordingly the present disclosure provides a tobacco production system that does not require separate steps of removing leaves from stalks, or midvein removal to obtain lamina, or certain other steps found in conventional tobacco production systems.

The present disclosure provides a system for producing useable tobacco material of an acceptable quality by threshing cured harvested tobacco material comprising leaves attached to stalks. In contrast, conventional systems for producing useable tobacco material do not thresh cured harvested tobacco material comprising leaves attached to stalks. In conventional Flue-Cured Virginia (FCV) production systems, leaves are removed (stripped) from the stalk prior to curing and only the FCV leaf material is cured, such that only cured FCV leaf material is threshed. In some conventional Burley type production systems, stalk-cut Burley (obtained by cutting the stalk to obtain harvested tobacco material comprising leaves attached to stalks) is cured and the cured Burley leaves are then removed, such that only the cured Burley leaf material is threshed. In other conventional Burley type production systems, leaves are removed (stripped) from the stalk prior to curing and only the Burley leaf material is cured, such that only cured Burley leaf material is threshed.

The present disclosure provides systems, guidelines, and teachings for processing the cured harvested tobacco plant material to remove the leaf material from the plant stalk and minimize the content of residual stalk material in the packed/finished product. Without wishing to be limited by this theory, it should be noted that because this type of processing had not been carried out previously, considerable thought was given to the best method and equipment setup prior to actually threshing the material, and the ability to experiment on the best threshing setup was limited due to the limited availability of leaf material (<3,000 lbs).

As illustrated in the non-limiting exemplary embodiments in the Examples below, curved harvested tobacco plant material from the first, second, and third harvests were combined in a single processing unit (LCF10), and the LCF10 processing unit was then divided into two lots (Lot 1 & Lot 2) for evaluation under two different processing setups. LCF10—Lot 2 was stored in LLTC's "sweat room" for approximately 160 minutes before processing, with a storage environment of approximately 90 degrees Fahrenheit and 90% relative humidity. LCF10—Lot 2 was threshed with a 2½-inch diamond shaped basket in one thresher operating at 600 revolutions per minute (RPM), while LCF10—Lot 1 was threshed with a 5-inch round-hole shaped basket in two threshers operating at 550 RPM. As shown in Table 11, for both lots representing different processing setups, the amount of total stem content in the material recovered after threshing was acceptable and represents useable fiber material, and almost none of the material was considered to be objectionable stem (OBJ).

Yield and Cost

In accordance with one aspect of the present disclosure, a tobacco production system is provided that enables yield increase and production cost decrease in comparison with various conventional tobacco production systems, where the presently disclosed system provides useable tobacco material having chemical and physical properties acceptable to tobacco industry stakeholders. For example, in one non-limiting exemplary embodiment described in the Examples and shown in Table 12, the presently disclosed system (also referred to as "the experimental low-cost tobacco production system" or "low cost tobacco production system") provided a 271% increase over conventional tobacco production, based on weight of usable tobacco material per production area (kg/ha or lbs/acre), including a 193% increase in lamina yield (kg/ha or lbs/acres). While the projected total cost of production per production area ($/ha or $/acre) was found to be similar for both production systems, the higher yields from the experimental low-cost tobacco production system reduced the cost per weight of useable tobacco material ($/kg or $/lb) compared to conventional tobacco production. The present experimental low-cost tobacco production system also utilizes less project labor per production area (man-days/ha or man-days/acre), and the labor used for the experimental low-cost tobacco production system is primarily machine labor, as compared to the requirement for manual labor as well as machine labor in conventional tobacco production.

As disclosed herein, illustrated in non-limiting exemplary embodiments presented below, a tobacco production system is provided that can produce tobacco in a biomass type system that is useable for commercial tobacco trade. The tobacco produced according to the present system is similar to several filler style tobaccos currently grown in different countries, but the use of direct seeding means the present system does not require the use of tobacco seedlings and one or more transplantation steps to grow the tobacco plants. The system provided herein produces a useable tobacco material, and has the potential to be a low cost tobacco material compared to most other commercially grown tobaccos produced using conventional systems.

EXAMPLES

Tobacco was grown entirely in a directly seeded system, at different high population densities, mechanically harvested to collect leaves and stalks that were cured together, and the resulting material was evaluated for chemical and physical properties of value in the tobacco industry, to determine the agronomic and usability potential of this production method and the resulting material.

The experiment was conducted in eastern North Carolina on a large commercial tobacco farm that provided access to certain production and curing expertise, equipment, labor and irrigation capabilities needed for the successful completion of this project. The soil type was classified by the USDA Soil Conservation Service as Norfolk sandy loam, considered a premier soil for traditional field production of tobacco in the southeastern U.S.A. Soil samples were taken to a depth of 5-7 inches, for pH and nutrient analyses by the North Department of Agriculture Agronomic Division.

A. Initial Fertilization and Fumigation

About one month before seeding was anticipated, the field was disked with an off-set disk harrow and the soil turned with a moldboard plow to bury surface residue from the previous corn crop. About three weeks later, labeled rates of Ridomil Gold®™ EC (mefenoxam) and Lorsban®™ 4E (chlorpyrifos) were applied broadcast for soil fungal disease and insect management, respectively, and the soil was again disked to incorporate the agrochemicals, but lightly enough to leave a level surface to maximize uniform broadcast application and incorporation of fertilizer materials. Results of the soil sample taken in early January did not indicate a need for pH adjustment with lime and available levels of essential nutrients, with the possible exception of sulfur (S), were high enough that only maintenance applications were required initially. These nutrients were broadcast on Mar. 20, 2010 using a mixture of four fertilizer materials (triple superphosphate; diammonium phosphate; potassium-magnesium sulfate; and calcium nitrate) at rates sufficient to supply the following rates, in U.S. pounds/acre (lbs/a) units, of the primary and secondary nutrients: nitrogen (N)=42; phosphorus ($P_2O_5$)=87; potassium ($K_2O$)=105; calcium (Ca)=26; magnesium (Mg)=53; and sulfur (S)=110. A light disking was used to incorporate the fertilizer materials.

Immediately following initial fertilizer incorporation, wooden stakes were placed across each end of the field to identify the centers of 21 beds, each 3.5 feet (ft.) wide with a 6 ft. wide working area bordering each bed. When soil temperatures at depths of 4-6 inches approached 55 degrees Fahrenheit (° F.), raised beds 3.5 ft. wide and 5-6 inches high were formed with a tractor-drawn commercial bed-forming implement fitted with a 3.5 ft.-wide fumigant injection attachment, with injection shanks spaced 6 inches apart. After 18 of the beds were formed, 98% methyl bromide was injected about 2 to 3 inches deep immediately in front of the bed forming operation at the rate of 9 U.S. pounds per 100 square yards, and the injected methyl bromide was immediately covered with approximately 8 inches of soil. Only minutes after the bedding and fumigant injection operation, a 4-mil polyethylene sheet material was applied over the beds to reduce gaseous loss of methyl bromide. In the same operation, the outside edges of the plastic sheet were sealed with soil. The plastic covers remained on the beds for two weeks before removal and the beds were allowed to ventilate naturally under dry, sunny conditions for three days before seeding. The remaining three non-fumigated beds were used for evaluation of herbicides without the use of methyl bromide.

B. Seeding

Seeds of the flue-cured tobacco variety GL 26 H (K326 with TMV resistance) were sown on Apr. 7, 2010 at three rates: 17 seeds per square foot; 34 seeds per square foot; and 51 seeds per square foot. The three seeding rates were used to determine if cured yield and/or product usability were influenced over a wide range of plant population densities. Each seeding rate was replicated six times, using 18 of the individual beds. The nonfumigated beds to be used for herbicide evaluations were seeded at the 51 seeds per square foot rate.

A water-seed sowing system, used occasionally on traditional seedbeds in eastern North Carolina and several ex-US countries, was modified for use in this experiment and mounted on the rear of a farm tractor. Polyethylene tubing attached to a 50 U.S. gallon polypropylene supply tank was routed through a hydraulically-driven centrifugal pump and then teed so that the polyethylene tubing could be attached to both ends of a seeding boom fabricated from ¾-inch diameter PVC pipe, 3.5 feet in length. Holes 1/16 inch in diameter were drilled 0.5 inches apart in a straight line across the 3.5-foot length of the seeding boom. The use of a hydraulically-driven pump provided a more consistent flow of the water-seed mixture to the boom than a power takeoff (PTO)-driven pump and feeding the water-seed mixture into both ends of the boom, rather than into one end, provided a more consistent seed supply over the length of the boom. The seeding-boom was mounted to the rear of the spray tank frame approximately 30 inches above the top of the raised beds and positioned so the seeding boom would cover the entire width of the 3.5-feet wide bed in a single pass.

After determining an operational tractor speed for the field conditions, water delivery was measured several times at operating speed and a tank fluid pressure of 15 pound per square inch (PSI). Water delivery was 0.053 U.S. gallons per linear foot of travel and was not affected by adding the highest rate of seeds and approximately 0.5 milliliters of liquid dish-washing detergent per gallon of water to improve seed dispersion. Continuous recirculation of the seed-water mixture by the hydraulically-driven centrifugal pump was also used to improve seed dispersion in the mixture.

Due to the irregular shape of the field, lengths of the 3.5-foot wide beds decreased from one side of the field to the other, so the amounts of water and seeds needed for each bed at each seeding rate were calculated separately, and seeding was completed from the lowest to highest seeding rates. When needed, the water-seed requirements of two or more beds of a given seeding rate were combined in a way that would not exceed the total water capacity of the spray tank. A 10 U.S. gallon reservoir of each water-seed mixture was maintained during seeding to provide constant flow to the boom while traveling over uneven soil. The seeds were weighed to the nearest milligram at the ULT laboratory near Nashville, N.C., and water was measured to the nearest U.S. fluid ounce in the field.

For protection against low temperatures, high winds, and heavy rainfall, the beds were covered within 24 hours after seeding with a moderate layer of pine needles, about 15-20 U.S. pounds per 100 square yards, and a commercial spun-polyester covering material sold as Reemay™.

Plant counts made 49 days after seeding indicated that about 71 percent of the seeds had survived at that point. This was moderately lower than expected and since germination appeared to be basically complete, it was considered unlikely that delaying the counts for another 10-15 days would have produced substantially higher survival rates. The lower than expected survival rates were probably due primarily to periods of higher than normal temperatures and rainfall, resulting in saturation of the upper 2 to 3 inches of soil during the seed germination phase.

C. Harvesting and Curing

A sickle-bar cutter originally manufactured by Strickland Brothers Machinery (near Spring Hope, N.C.) for harvest of sweet potato seedlings was modified and used for three harvests of plant material on July 6, August 17, and October 20, corresponding to 90, 131, and 195 days after seeding, respectively. Basically, the sickle-bar cutter, powered from the tractor's hydraulic system, was mounted in front of a conveyor belt that delivered the plant material to a container which was identified by bed number and transported to the barn area for weighing, recording certain measurements, and curing. Height of the sickle bar was controlled hydraulically and cutting height above ground level for the first harvest was approximately 5-7 inches, and was increased another 1-2 inches for each of the next two harvests to minimize the content of hardened stems from the previous cutting in the freshly-cut material. Increasing the cutting height also left more photosynthetic material to support growth/regrowth for the next cutting, as well as more leaf axils which produced auxiliary buds (i.e., "shoots") for harvest in the next cutting.

Stem length, base stem diameter measurements, and leaf counts were made on 25 randomly selected plants from each of 12 beds, equivalent to four replications of each seeding rate. The purpose of these measurements was to quantify characteristics of the plants that could potentially assist in deciding when to harvest in order to optimize yield and usability of the cured product. Stem (often referred to as "stalk" by tobacco farmers and others in the tobacco industry) size is also an important factor in the cost of leaf processing, so base stem diameters were measured with calipers 0.25 to 0.5 inch above the cut of fresh stems and again after curing to determine reduction in stem size related to curing. While there is unpublished data on midvein size reduction in green tobacco leaves during curing, we are not aware of similar data for tobacco stems (a.k.a. stalk).

After curing of a harvest was completed, the product from each bed was weighed for yield calculations, and 20-25 pound samples of each seeding rate were randomly selected and composited over replications as the product was transferred from the curing boxes to storage bins. The cured samples were used for physical evaluations by company personnel and for reducing sugars, total alkaloids and several other chemical analyses by Global Laboratory Services (Wilson, N.C.). Larger amounts of cured tobacco were also processed and evaluated.

Test of Air-Curing

A small amount (approximately 20 pounds) of the harvested material was allowed to air-cure for evaluation of alternative curing methods. Material from the first harvest was placed on wire rack table under a metal roofed equipment storage shed and allowed to passively air-cure. The resulting cured material from the first harvest was considerably dark brown to black in color and signs of water damage and mold growth were noted. Material from the third harvest was placed on a black plastic sheet cover soil inside an unoccupied greenhouse and allowed to passively air-cure. This material remained undisturbed for more than 8 weeks before inspection. The cured material from the third harvest had acceptable visual quality, being brown to light orange in color with very little green color. This preliminary evaluation demonstrated that air-curing of the material is possible, if necessary.

Tables 1-3 report measurements of yield, green stalk thickness, cured stalk thickness, stem length, and leaf number for the first harvest (Table 1), second harvest (Table 2), and third harvest (Table 3).

D. Additional Fertilization and Foliar Pesticides

Additional fertilization was needed during the 6-month course of the experiment, particularly between seeding and the first harvest, because of higher than normal rainfall during that 90-day period. When liquid nitrogen sources were applied over-top with a tractor-mounted sprayer, labeled rates of Quadris®™ (azoxystrobin) for management of leaf fungi and Coragen®™ (chlorantraniliprole), Belt®™ (flubendiamide) or Orthene®™ (acephate) for foliar insect management were tank-mixed with the N source. Use of the three insecticides were rotated to reduce the risk of some insects developing resistance to their active ingredients. Brief descriptions of these applications follow:

Between Seeding and First Harvest:
- 26 May 2010: 450 lbs/a 09-05-10, a dry commercial fertilizer, was applied broadcast overtop of beds with a mechanical spreader; pesticides were not applied. Nutrients applied were (lbs/a): N=41; $P_2O_5$=23; $K_2O$=45; Ca=5; Mg=9; and S=36.
- 31 May 2010: 5.9 gal/a 25-0-0 liquid (10 lbs/gallon) plus labeled rates of Quadris®™ and Coragen®™ were mixed with water and sprayed overtop. The only nutrient applied was N at the rate of 15 lbs/a.
- 18 Jun. 2010: 275 lbs/a 20-10-20 water-soluble dry fertilizer was dissolved in water and sprayed overtop; pesticides were not applied. Nutrients applied were (lbs/a): N=55, $P_2O_5$=27.5; $K_2O$=55.

Between First and Second Harvests:
- 16 Jul. 2010: 4 gallons/acre (gal/a) 24% liquid N plus 3% S, Quadris®™ and Belt®™ were added and all mixed with water and sprayed overtop. Rates of N and S applied were 10.3 and 1.3 lbs/a, respectively.
- 9 Aug. 2010: 4 gal/a 24% liquid N plus 3% S, Quadris®™ and Orthene®™ were added and all mixed with water and sprayed overtop. Rates of N and S were 10.3 and 1.3 lbs/a, respectively.

Between Second and Third Harvests:
- 8 Aug. 2010: 4 gal/a 24% liquid N plus 3% S, Quadris®™ and Belt®™ were added and all mixed with water and sprayed overtop. Rates of N and S were 10.3 and 1.3 lbs/a, respectively.
- 13 Oct. 2010: 4 gal/a 32% liquid N; pesticides were not applied. N rate was 14 lbs/a.

In summary, the total quantities of the primary and secondary nutrients applied over the duration of the experiment were (lbs/a): N=198, $P_2O_5$=138, $K_2O$=205, Ca=31, Mg=62, and S=150. The rate of N ultimately used was estimated to be approximately 25-30% higher than would have been necessary under more normal rainfall conditions during the first 100 days of the experiment.

E. Threshing/Processing and Quantitative Measurements of Leaf Chemistry

A tobacco leaf can be divided into two basic components: lamina (inter-connective leaf tissue) and stem (stem is a tobacco industry term for the midvein, which attaches the entire leaf to the tobacco stalk). Farmers remove the tobacco leaves, either before harvest in flue-cured tobacco or post curing such as in stalk-cut burley, and typically market only the tobacco leaves. In conventional tobacco processing or threshing, tobacco leaves purchased from the farmer are fed into specialized equipment where the tobacco leaf's midvein is mechanically removed, and the tobacco lamina is packed for long term storage. The process often requires the addition of steam and water (mist) before, and sometimes during, threshing, and a drying (redrying) phase to lower moisture to a suitable level after threshing and before packing/prizing. In addition, non-tobacco related material (NTRM), such as grass, sand, etc. is removed and discarded during the threshing process.

Threshing of the low cost tobacco experimental material was different from conventional whole leaf threshing, as this initial low cost tobacco experimental material for threshing consisted of leaves attached to stalks/stems. The objective of this tobacco processing run was to remove the leaf material from the plant stalk and minimize the content of residual stalk material in the packed/finished product. As it was understood that this type of processing had not been carried out previously, considerable thought was given to the best method and equipment setup prior to actually threshing the material. The ability to experiment on the best threshing setup was limited due to the limited availability of leaf material (<3,000 lbs). Many modern tobacco processing facilities can process 10 times this weight in one hour.

Processing or threshing of the 2010 low cost tobacco material was conducted at Lancaster Leaf Tobacco Company's (LLTC) processing facility in Lancaster, Pa. on Jan. 13, 2011. LLTC's facility was selected due to its lower throughput machinery and its ability and experience in handling smaller volume production runs. The available plant material from the 2010 field trial site was shipped to LLTC in C48 cardboard cartons and, due to the relatively small volume of material available, all treatments (plant populations) and all harvests (first, second, and third) were composited into one processing unit, coded as LCF10.

LCF10 was divided into two lots (Lot 1 & Lot 2) for evaluation under two different processing setups. LCF10—Lot 2 was stored in LLTC's "sweat room" for approximately 160 minutes before processing, with a storage environment of approximately 90 degrees Fahrenheit and 90% relative humidity. LCF10—Lot 2 was threshed with a 2½-inch diamond shaped basket in one thresher operating at 600 revolutions per minute (RPM), while LCF10—Lot 1 was threshed with a 5-inch round-hole shaped basket in two threshers operating at 550 RPM.

The threshing details are outlined below:

Material Received
- 58 cases @ 2950 lbs Net Weight initial receiving
- 1 case @ 36 lbs (Sample case sent to LLTC for Inspection)
- Re-weight 2872 lbs Net Weight—all material just prior to starting the threshing process Preconditioning
- Vacuum Chambers
- Tops removed from C48 cartons and cartons placed on racks for conditioning
- 40 cases processed in MacVac and 19 cases processed Vacudyne
  - 1 cycle-170 degrees Fahrenheit—Steam added—No Water added Bulking
- 10-foot wide by 40-foot long Ordering Cylinder, set at:
  - 100% Steam on Inlet and Outlet
  - 10% Water on Inlet only
- 4 Pickers—to remove non-tobacco related materials (NTRM)
- Mobile Silos #2 filled @ approx. 1760 lbs (No Sweat Room) Lot 1
  - Fed directly to the threshing/processing plant
- Mobile Silo #1 filled @ approx 1190 (Sweat Room) Lot 2
  - Held in Sweat Room (90 degrees F.—90% RH Approx 160 min)

Threshing
  Lot 1—No Sweat Room—Not Sweated
    Picking
      6 Pickers (4 Pickers Pre-Thresh & 2 Pickers Post-Thresh)
    Ordering Cylinder
      8-foot wide by 32-foot long Ordering Cylinder, set at:
        100% Steam Inlet, Outlet and Super Steam
        25% Water Outlet
    Threshing Line Setup
      $1^{st}$ Stage—5" round hole baskets—2 Threshers—550 RPM
      $2^{nd}$ Stage—2" diamond baskets—1 Thresher
      $3^{rd}$ Stage—4" round hole baskets—1 Thresher
      $4^{th}$ Stage—No Basket
      $5^{th}$ Stage—No Basket
  Threshing
  Lot 2—Sweat Room
    Picking
      6 Pickers (4 Pickers Pre-Thresh & 2 Pickers Post-Thresh)
    Ordering Cylinder
      8'×32' Ordering Cylinder
        100% Steam Inlet, Outlet and Super Steam
        25% Water Outlet
    Threshing Line Setup
      $1^{st}$ Stage—2½" Diamond baskets—1 Threshers—600 RPM
      2nd Stage—2" diamond baskets—1 Thresher
      $3^{rd}$ Stage—4" round hole baskets—1 Thresher
      $4^{th}$ Stage—No Basket
      $5^{th}$ Stage—No Basket
  Prizing—Packing Threshed Material
    Not Sweated ("No Swtroom" printed on label)—Produced 3 units=883 lbs
    Sweat Room ("Swtroom" printed on label) Produced 2 units=597 lbs
    1,480 lbs of packed lamina material for LCF10
  Quality Data
    Degradations and Stem Content Results
      See Table 11
    Moisture Results—Pre-Thresh and Finished Product
      Pre-Threshing
        Average moisture 18.5%
      Threshed and Packed Material
        Average moisture 14.5%
    NTRM Search Results (weight basis)
      Pre-Threshing
        0.33% Grass, straw, etc.
      LCF10—Lot 1
        0.17% Grass, straw, etc.
      LCF10—Lot 2
        0.12% Grass, straw, etc.
    Sugar and Total Alkaloid Tests—Global Laboratory Services
      LCF10—Lot 1
        0.56% Total Alkaloids
        9.7% Reducing Sugars
        14.5% Total Sugars
      LCF10—Lot 2
        Below Quantification Limit (BQL) of Testing Method for % Total Alkaloids
        9.3% Reducing Sugars
        13.5% Total Sugars
  Yield—Strip or Lamina
    md Approximately 50% factory lamina yield
      Table 8 includes data on hand-stemmed measurements
      Hand-stemmed measures were whole leaf with midvein included
      The material's midvein was small enough and not objectionable It was concluded that this tobacco material could be threshed successfully. Even with the reduced number of stages utilized in the processing run, it was believed that the tobacco material was over-threshed due to the low percentage of whole leaves and the large amount of fiber material in the stem test results (see Table 11). The measured hand-stemmed ("hand-strip") data in Table 8 showed a 62% to 77% lamina yield, compared to the measured 50% factory yield. The hand-stemmed data was based on whole leaves, which includes the midvein. In the present system, the stem (midvein) size can be influenced by harvesting, and a whole leaf which has a cured stem (midvein) diameter of less than 3/32 of an inch is not objection stem (OBJ). It is also expected the factory yield would increase if more of this tobacco material were available for threshing, as small tobacco processing lots tend to have lower strip/lamina yields.

F. Subjective Evaluation of Quality and Flavor

Both non-threshed and threshed tobacco material were reviewed by experienced tobacconists employed by Universal Leaf Tobacco Company. In addition, sample cigarettes of the threshed tobacco material were smoked by these same experts for flavor evaluation. The overall opinion was positive in terms of the visual appearance of the processed tobacco material, and the smoke flavor evaluations indicated this material was suitable as a filler style tobacco.

The presence of "green" leaf material was noted both visually and in smoke evaluations, which is generally considered undesirable in most tobacco utilized in a smoking related product. However the amount of "green" noted in the smoke evaluations was not significant enough to make this material unusable.

The presence of green leaf material was greatest in the first harvest due to excessive nitrogen fertilization prior to this harvest. The "green" leaf material was primarily concentrated in the upper 2 to 4 leaves of each plant, with the lower leaves curing to a desirable color (lemon, orange, light brown). Improvements in nitrogen management in the second and third harvest reduced the amount of green leaf material in the cured product, but it was not completely eliminated. Future improvements and refinement in the production and management systems will further reduce the amount of green color in the cured material.

G. Results and Conclusions

1. Yield and Dimensions of Harvested Material

The yield, green stalk thickness, cured stalk thickness, stem length, and leaf number are reported for mechanically threshed material from the first harvest (Table 1), second harvest (Table 2), and third harvest (Table 3), from plant populations grown at three different densities of 750,000 plants/acre, 1,500,000 plants/acre, and 2,250,000 plants/acre, in the present experimental system. Although not statistically significant, green and cured stem/stalk thickness generally declined as plant population increased for each of the first two harvests. Curing the material reduced green stalk thickness by about 32 percent when averaged over the first two harvests.

"Cured leaf yield" as shown in the tables below is a measurement of the cured harvested tobacco material obtained after each harvest, where the cured harvested tobacco material comprises leaves attached to stalks and cured leaf yield includes the cured leaf attached to the cured stalk.

Thus, each harvest yielded harvested tobacco material that was 'leafy' and had thin stalks, such that the harvested tobacco material had a higher leaf to stalk ratio and the entire

TABLE 1

Yield, Green and Cured Stalk Thickness, Stem Length, and Leaf Number at the First Harvest, 2010

| Plant Population | | Cured Leaf Yield | Yield Ratio | Green Stalk | Cured Stalk | Reduction in Stalk Thickness | Stem/Stalk | No. of Leaves |
|---|---|---|---|---|---|---|---|---|
| plants/acre | seeds/ft² | lbs/acre | cured wt/green wt | Thickness inches | Thickness inches | During Curing % | Length inches | per plant |
| 750,000 | 17 | 2811 a | 0.142 a | 0.357 a | 0.228 a | 34.7 a | 12.02 a | 6.37 a |
| 1,500,000 | 34 | 3822 a | 0.138 a | 0.323 a | 0.222 a | 31.5 a | 12.30 a | 5.85 b |
| 2,250,000 | 51 | 3695 a | 0.132 a | 0.282 b | 0.203 a | 28.0 a | 11.16 a | 5.42 b |

Means followed by the same letter within columns are not significantly different using Fisher's Protected LSD, $p \leq 0.05$.

TABLE 2

Yield, Green and Cured Stalk Thickness, Stem Length, and Leaf Number at the Second Harvest, 2010

| Plant Population | | Cured Leaf Yield | Yield Ratio | Green Stalk | Cured Stalk | Reduction in Stalk Thickness | Stem/Stalk | No. of Leaves |
|---|---|---|---|---|---|---|---|---|
| plants/acre | seeds/ft² | lbs/Acre | cured wt/green wt | Thickness inches | Thickness inches | During Curing % | Length inches | per plant |
| 750,000 | 17 | 1882 a | 0.120 a | 0.334 a | 0.229 a | 31.5 a | 9.86 a | 7.48 a |
| 1,500,000 | 34 | 2147 a | 0.133 a | 0.311 a | 0.218 a | 30 a | 8.15 a | 6.83 a |
| 2,250,000 | 51 | 1868 a | 0.120 a | 0.305 a | 0.187 a | 38.5 a | 8.07 a | 6.59 a |

Means followed by the same letter within columns are not significantly different using Fisher's Protected LSD, $p \leq 0.05$.

TABLE 3

Yield, Green and Cured Stalk Thickness, Stem Length, and Leaf Number at the Third Harvest, 2010

| Plant Population | | Cured Leaf Yield | Yield Ratio | Green Stalk | Cured Stalk | Reduction in Stalk Thickness | Stem/Stalk | No. of Leaves |
|---|---|---|---|---|---|---|---|---|
| plants/acre | seeds/ft² | lbs/Acre | cured wt/green wt | Thickness inches | Thickness inches | During Curing % | Length inches | per plant |
| 750,000 | 17 | 1497 | NA | 0.311 | NA | NA | 5.43 | 6.91 |
| 1,500,000 | 34 | 1219 | NA | 0.289 | NA | NA | 3.58 | 6.16 |
| 2,250,000 | 51 | 1110 | NA | 0.243 | NA | NA | 2.83 | 5.96 |

Means followed by the same letter within columns are not significantly different using Fisher's Protected LSD, $p \leq 0.05$. Yield data are for one replication of each plant population only. Cured leaf yield data are based on green weight yields using an estimate of 12% cured weight yield.

The plant architecture of the harvested tobacco material and the cured harvested tobacco material is illustrated by the values in the tables. The harvested tobacco material that was "leafy" and had thin stalks, such that the harvested tobacco material had a higher leaf to stalk ratio and the entire harvested leaf and stalk was suitable for curing and threshing to yield threshed cured tobacco material acceptable for use in tobacco products.

The number of leaves per plant, i.e., the number of leaves in the above-ground portion of the plant that was harvested, ranged from 5.42 to 7.48 leaves per plant, with between 5.96 to 6.91 leaves per plant even for the shorter stalks harvested at the third harvest. The stem/stalk length, i.e., the above-ground portion of the plant that was harvested, was between 2.83 to 12.3 inches, with significant differences between harvests. Stem/stalk length was about 11-12 inches at first harvest, 8-10 (8.07 to 9.86) inches at the second harvest, and 3-5½ inches (2.83-5.43) at the third harvest, with the highest density planting having a shorter length at the third harvest.

harvested leaf and stalk were suitable for curing and threshing to yield threshed cured tobacco material acceptable for use in tobacco products.

The harvested tobacco material had thin, non-woody stalks that were acceptable for use in tobacco products after curing and threshing. The green stalk thickness was between 0.243 to 0.357 inches, with similar stalk thickness values across all harvests, and a trend to lower stalk thickness (i.e., thinner stalks) at higher planting densities. The stalks showed a dramatic reduction in stalk thickness as a result of curing, with a reduction of between 28.0-34.7% for the first harvest material and a reduction of between 30-38.5% for the second harvest material, yielding cured stalk thickness of between 0.187 to 0.229 inches. Thus, the cured harvested tobacco material had thin stalks such that the entire cured harvested tobacco material with cured leaves attached to cured stalks was suitable for threshing to yield threshed cured tobacco material acceptable for use in tobacco products.

2. Chemistry of Cured Material

Cured material from the first and separate harvests, obtained by various processing methods, were separately analyzed and reported as nitrate, reducing sugars, total sugars, total alkaloids, and as the ratio of reducing sugar to total alkaloids and the ratio of total sugar to total alkaloids. The measurement of "total alkaloids" is used to represent nicotine content, as it is understood that nicotine is the major alkaloid in most tobacco varieties, usually accounting for approximately 95% of the fraction extracted and measured as total alkaloids. Cured leaf chemistry is reported for leaf material from the first harvest (Table 4) and second harvest (Table 6). Cured stalk chemistry is reported for stalk material from the first harvest (Table 5), second harvest (Table 7), and third harvest (Table 7). Cured leaf concentrations of reducing sugars and total alkaloids in material from this experiment were considerably different compared to flue-cured tobacco grown and cured in the traditional (conventional) manner in the Southeastern U.S.A., e.g., levels shown in Table 9, particularly the lower total alkaloid levels, i.e., lower nicotine levels.

Therefore, the resulting reducing sugar/total alkaloid ratios in cured leaf material were substantially higher than those of conventional grown flue-cured tobacco in the Southeastern U.S.A. Compared to experimental cured leaves, the stalks contained slightly higher reducing sugar concentrations but substantially lower total alkaloid concentrations, resulting in very high reducing sugar/total alkaloid ratios. The concentrations of TSNAs (tobacco specific nitrosamines) were low and below the detection limit (BDL) by Global Laboratory Services TSNA method.

TABLE 4

Cured Leaf Chemistry at the First Harvest, 2010

| Plant Population | | Nitrate % | Reducing Sugars % | Total Sugars % | Total Alkaloids % | Reducing Sugar/ Total Alkaloids Ratio | Total Sugar/ Total Alkaloids Ratio |
|---|---|---|---|---|---|---|---|
| plants/ acre | seeds/ $ft^2$ | | | | | | |
| 750,000 | 17 | 0.09 | 8 | NA | 0.43 | 18.6 | NA |
| 1,500,000 | 34 | 0.18 | 6.2 | NA | 0.25 | 24.8 | NA |
| 2,250,000 | 51 | 0.12 | 7.5 | NA | 0.33 | 22.7 | NA |

TABLE 5

Cured Stalk Chemistry at the First Harvest, 2010

| Plant Population | | Nitrate % | Reducing Sugars % | Total Sugars % | Total Alkaloids % | Reducing Sugar/ Total Alkaloids Ratio | Total Sugar/ Total Alkaloids Ratio | TSNAs ppm |
|---|---|---|---|---|---|---|---|---|
| plants/ acre | seeds/ $ft^2$ | | | | | | | |
| 750,000 | 17 | 0.1 | 12.9 | NA | 0.08 | 161.3 | NA | BDL |
| 1,500,000 | 34 | 0.15 | 12.3 | NA | 0.09 | 136.7 | NA | BDL |
| 2,250,000 | 51 | 0.12 | 12.1 | NA | 0.11 | 110 | NA | BDL |

TABLE 6

Cured Leaf Chemistry at the Second Harvest, 2010

| Plant Population | | Nitrate % | Reducing Sugars % | Total Sugars % | Total Alkaloids % | Reducing Sugar/ Total Alkaloids Ratio | Total Sugar/ Total Alkaloids Ratio | TSNAs ppm |
|---|---|---|---|---|---|---|---|---|
| plants/ acre | seeds/ $ft^2$ | | | | | | | |
| 750,000 | 17 | 0.06 | 9.5 | 17.5 | 0.45 | 21.1 | 38.9 | BDL |
| 1,500,000 | 34 | 0.04 | 9.8 | 17.1 | 0.4 | 24.6 | 43 | BDL |
| 2,250,000 | 51 | 0.05 | 8.3 | 15.7 | 0.39 | 21.3 | 40.3 | BDL |

TABLE 7

Cured Stalk Chemistry at the Second Harvest, 2010

| Plant Population | | Nitrate % | Reducing Sugars % | Total Sugars % | Total Alkaloids % | Reducing Sugar/ Total Alkaloids Ratio | Total Sugar/ Total Alkaloids Ratio |
|---|---|---|---|---|---|---|---|
| plants/ acre | seeds/ $ft^2$ | | | | | | |
| 750,000 | 17 | 0.07 | 13.7 | 21.1 | <0.28 | 49.8 | 76.7 |
| 1,500,000 | 34 | 0.06 | 14.3 | 20.1 | <0.28 | 52 | 73.1 |
| 2,250,000 | 51 | 0.06 | 13.1 | 19.2 | <0.28 | 47.6 | 69.8 |

3. Comparative Yield Values of Mechanically Threshed and Hand-Strip Leaves

Table 8 reports comparative yield values for mechanically threshed cured material, and "hand-strip" cured leaves that were hand-stripped to remove the midvein and leave the lamina, at the first harvest and the second harvest, from plant populations grown at plant population densities of 750,000 plants/acre, 1,500,000 plants/acre, and 2,250,000 plants/acre, grown according to the experimental system.

Yield values for mechanically threshed cured material are expressed as "cured leaf yield" in lbs/acre, and are the same as the values reported in Table 1 for the first harvest, and Table 2 for the second harvest. Two different yield values are reported for "hand-stripped" cured leaves that were stripped to remove the midvein and leave the lamina, where "hand strip yield" by % reports the average percentage of the total leaf recovered as lamina, and "lamina yield" in lbs/acre reports the calculated total yield available per acre if the plants were hand-stripped instead of mechanically threshed. As reported in part E above, mechanical threshing of cured harvested tobacco plant material produced approximately 50% lamina yield ("50% factory lamina yield").

It was concluded that this tobacco material could be threshed successfully. Even with the reduced number of stages utilized in the processing run, it was believed that the tobacco material was over-threshed due to the low percentage of whole leaves and the large amount of fiber material in the stem test results (see Table 11). The measured hand-stemmed ("hand-strip") data in Table 8 showed a 62% to 77% lamina yield, compared to the measured 50% factory yield. The hand-stemmed data was based on whole leaves, which includes the midvein. As a result of this production system, the stem (midvein) size can be influenced by harvesting, and a whole leaf which has a cured stem (midvein) diameter of less than 3/32 of an inch is not objection stem (OBJ). It is also expected the factory yield would increase if more of this tobacco material were available for threshing, as small tobacco processing lots tend to have lower strip/lamina yields.

4. Comparative Yield of Tobacco Grown and Processed in Conventional System, and Tobacco Grown and Processed in Experimental System Table 9 reports 2010 yield values for the five most popular flue-cured tobacco cultivars in the United States (NC 196, K 326, CC 27, NC 71, K 346) when grown and processed using conventional production systems, e.g., grown at an average plant population density of 6000 plants per acre. Table 10 reports cured leaf yield for tobacco cultivar GL26 H from the experimental system, expressed as the yield in lbs/Acre obtained after the first harvest, the second harvest, and the third harvest, and the summed total yield, from plants grown at plant population densities of 750,000 plants/acre, 1,500,000 plants/acre, and 2,250,000 plants/acre. As shown in Table 10, per acre cured yields declined substantially from the first to third harvest, but when summed over the three harvests, the average yield in this experiment was twice the average yield of the five most popular flue-cured varieties grown in the conventional manner in the southeastern USA in 2010. As shown in Table 10, plant population density did not affect yield in a consistent statistically significant manner, but for each of the first two harvests, the medium density population grown at 1,500,000 (1.5 million) plants/acre, produced higher yields than the lowest or highest population.

When cured harvested tobacco material produced according to the presently disclosed production system was "hand stemmed" or "hand stripped" to obtain lamina, the strip chemistry also showed nicotine levels (total alkaloids) of about 0.5%. As shown in the non-limiting exemplary embodiment in the Examples below, cured leaf material had nicotine (total alkaloid) levels of between 0.25 to 0.45%, and cured stalk material had nicotine (total alkaloid) levels of between 0.08 to <0.28%. In a non-limited exemplary embodiment, hand-stripped cured leaf material had a nicotine level of 0.56%. In contrast, nicotine levels of conventionally produced tobacco (measured as total alkaloids), which can depend on the cultivar and the curing method, are usually higher. For example, as shown in Table 9 (below) for the five more popular flue-cured tobacco (FCV) cultivars in the United States, average nicotine (total alkaloid) levels are between 2.9 to 3.23%.

TABLE 8

Cured Leaf Yield, Hand Strip Yield, and Lamina Yield for First and Second Harvest, 2010

| Plant Population | | First Harvest | | | Second Harvest | | |
|---|---|---|---|---|---|---|---|
| plants/ acre | seeds/ $ft^2$ | Cured Leaf Yield lbs/Acre | Hand Strip Yield % | Lamina Yield lbs/Acre | Cured Leaf Yield lbs/Acre | Hand Strip Yield % | Lamina Yield lbs/Acre |
| 750,000 | 17 | 2811 | 65.7 | 1819 | 1882 | 73 | 1374 |
| 1,500,000 | 34 | 3822 | 62 | 2311 | 2147 | 77.1 | 1655 |
| 2,250,000 | 51 | 3695 | 62 | 2249 | 1868 | 76.7 | 1433 |

TABLE 9

Plant Population, Yield, Leaves Per Plant, Plant Height, Reducing Sugars, and Total Alkaloids for the Five Most Popular Flue-cured Tobacco Cultivars in the United States, 2010

| Cultivar | Avg. Plant Population plants/Acre | Yield lbs/Acre | Leaves Per Plant # | Plant Height inches | Reducing Sugars % | Total Alkaloids % | Reducing Sugar/ Total Alkaloids Ratio |
|---|---|---|---|---|---|---|---|
| NC 196 | 6,000 | 3052 | 18.3 | 39 | 14.4 | 2.95 | 4.88 |
| K 326 | 6,000 | 3203 | 18.1 | 37 | 15.2 | 2.9 | 5.24 |
| CC 27 | 6,000 | 3198 | 18.1 | 38 | 14.2 | 3.12 | 4.55 |
| NC 71 | 6,000 | 3234 | 17.8 | 36 | 14.75 | 3.23 | 4.57 |
| K 346 | 6,000 | 2852 | 17.7 | 37 | 13.98 | 3.07 | 4.55 |

Data are an average of four locations in North Carolina in 2010.
Source: Fisher, L. R., A. M. Stewart, W. D. Smith, G. Tart, and K. Barnes. 2011. Selecting a Variety. In 2011 Flue-cured Production Guide. North Carolina Cooperative Extension Service. North Carolina State University. AG-187. pp 25-48.

TABLE 10

Total Cured Leaf Yield, 2010

| Plant Population | | Cured Leaf Yield (lbs/Acre) | | |
|---|---|---|---|---|
| plants/acre | seed/ft2 | 1st Harvest | 2nd Harvest | 3rd Harvest |
| 750,000 | 17 | 2811 | 1882 | 1497 |
| 1,500,000 | 34 | 3822 | 2147 | 1219 |
| 2,250,000 | 51 | 3695 | 1868 | 1110 |

Yield data at $1^{st}$ and $2^{nd}$ harvest are the average of 4 replications of each plant population.
Yield data at the $3^{rd}$ harvest are from one replication of each plant population 5. Threshing Results Table 11 reports the post-threshing results for material prepared according to the experimental system. As described above, cured material from all harvests (first, second, and third) were combined into one processing unit designated LCF10, and LCF10 was then divided into two lots (Lot 1 & Lot 2) for evaluation under two different processing setups. Cured material of LCF10—Lot 1 was not "sweated" prior to threshing, and LCF10—Lot 1 was threshed with a 5-inch round-hole shaped basket in two threshers operating at 550 RPM. Cured material in LCF10—Lot 2 was stored in LLTC's "sweat room" for approximately 160 minutes before processing, with a storage environment of approximately 90 degrees Fahrenheit and 90% relative humidity, and LCF-10—Lot 2 was then threshed with a 2½-inch diamond shaped basket in one thresher operating at 600 revolutions per minute (RPM).

As shown in Table 11, the total stem content appears to be higher than conventional tobacco's processing results, however, the actual material that comprises the reported total stem percentages is actually useable fiber material. It is believed these unusual results are due to the stem testing unit becoming clogged because of the large amount of fiber material in the threshed product. Nevertheless, a standard industry testing method was used in the evaluation of this processed material. Lot-2 which was threshed with a 2½-inch diamond threshing basket in the first stage appears, numerically, to have a lower amount of small lamina and fines compared to Lot-1. The additional storage time of Lot-2 in the sweat room could have also impacted these results.

6. Comparison of Conventional Tobacco Production and Experimental Tobacco Production The summary presented in Table 12 below compares various aspects of conventional tobacco production based on NC State University's flue-cured tobacco budget estimates, with measured and projected values for production for the experimental low-cost tobacco production method provided in the present disclosure, with values calculated for kg and ha in Table 12(a) and values calculated for lbs and acres in Table 12(b). The experimental low-cost tobacco production system provided a 271% increase over conventional tobacco production, based on weight of usable tobacco material per production area (kg/ha or lbs/acre). While the projected total cost of production per production area (hectare or acre) is similar for both production systems (7% difference), the

TABLE 11

Post Threshing Degradation Test Results

| Process & Grate | Sample Date | Sample Wt | Over 1" | Over ½" | Total | Over ¼" | Total | Over ⅛" | PAN | OBJ | Total Stem |
|---|---|---|---|---|---|---|---|---|---|---|---|
| LCF 10 - Lot 1 | | | | | | | | | | | |
| LCF10 LCF10 | Jan. 13, 2011 12:33 | 106.9 | 47.8 | 19.27 | 67.07 | 23.99 | 91.06 | 7.06 | 1.87 | 0.03 | 8.14 |
| LCF10 LCF10 | Jan. 13, 2011 13:10 | 100.75 | 42.73 | 21.99 | 64.72 | 24.71 | 89.43 | 7.79 | 2.78 | 0.06 | 8.83 |
| LCF 10 - Lot 2 | | | | | | | | | | | |
| LCF10 LCF10 | Jan. 13, 2011 13:36 | 102.65 | 41.55 | 29.71 | 71.26 | 22.6 | 93.86 | 4.92 | 1.22 | 0.08 | 7.99 |
| LCF10 LCF10 | Jan. 13, 2011 13:59 | 99.1 | 43.79 | 29.92 | 73.71 | 21.14 | 94.85 | 4.09 | 1.06 | 0.04 | 8.68 | higher yields provided by the experimental low-cost tobacco production system reduce the cost per weight of useable tobacco material (kg or lb) compared to conventional tobacco production. The experimental low-cost tobacco production system also requires less project labor per production area (man-days/ha or man-days/acre), and the labor used for the experimental low-cost tobacco production system is primarily machine labor, as compared to the requirement for manual labor as well as machine labor in conventional tobacco production.

TABLE 12(a)

Summary Comparison between Conventional Flue-Cured Tobacco and Low Cost Tobacco Production (kg/ha)

| U.S. Grown | Conventional Flue Cured Virginia (FCV) Production System Yield and Estimated Cost of Production - NCSU | Experimental Low Cost Tobacco Production System Yield and Projected Cost of Production | Difference Between Experimental Low-Cost Production System and Conventional FCV Production System | % Difference Type of Change (↑Increase or ↓Decrease) |
|---|---|---|---|---|
| Yield (kg/ha) | 2,688 | 7,280 | 4,592/ha | 271% ↑ |
| Cost of Production ($/ha) | $9,005 | $9,660 | $655/ha | 7% ↑ |
| Cost of Production ($/kg) | $3.35 | $1.33 | $2.02/kg | 60% ↓ |
| Labor (man-days/ha) | 32 | 20 | 12/ha | 38% ↓ |
| Green Price ($/kg) (% return above cost of production) | $3.83 (@ 14%) | $1.60 (@20%) | $2.23/kg | 58% ↓ |
| Lamina (kg/ha) (% lamina strip yield) | 1,882 kg/ha @ 70% | 3,640 kg/ha @ 50% | 1,758 kg/ha | 193% ↑ |

TABLE 12(b)

Summary Comparison between Conventional Flue-Cured Tobacco and Low Cost Tobacco Production (lbs/acre)

| U.S. Grown | Conventional Flue Cured Virginia (FCV) Production System Yield and Estimated Cost of Production - NCSU | Experimental Low Cost Tobacco Production System Yield and Projected Cost of Production | Difference Between Experimental Low-Cost Production System and Conventional FCV Production System | % Difference Type of Change (↑Increase or ↓Decrease) |
|---|---|---|---|---|
| Yield (lbs/acre) | 2,400 | 6,500 | 4,100/acre | 271% ↑ |
| Cost of Production ($/acre) | $3,602 | $3,864 | $262/acre | 7% ↑ |
| Cost of Production ($/lbs) | $1.50 | $0.59 | $0.91/lbs | 60% ↓ |
| Labor (man-days/acre) | 12.8 | 8 | 4.8/acre | 38% ↓ |
| Green Price ($/lbs) (% return above cost of production) | $1.70 (@ 14%) | $0.71 (@20%) | $0.99/lbs | 58% ↓ |
| Lamina (lbs/acre) (% lamina strip yield) | 1,680 lbs/acre @ 70% | 3,250 lbs/acre @ 50% | 1,570 lbs/acre | 193% ↑ |
| Lamina green Cost ($/lbs) (% lamina strip yield) | $2.43/lbs @ 70% | $1.42/lbs @ 50% | $1.01/kg | 41% ↓ |

Among other things, in one embodiment the tobacco production system as provided herein can be practiced by direct seeding of tobacco seeds at a rate sufficient to produce a plant population density of at least 750,000 tobacco plants per acre after germination, or at least 1,500,000 tobacco plants per acre after germination, or at least 2,250,000 tobacco plants per acre after germination. In one embodiment, the tobacco production system disclosed herein can be practiced by carrying out two harvests during the growing season, three harvests during the growing season, or four harvests during the growing season.

7. Leaf Area Estimates of Cured Low Cost Experimental Tobacco

The table below shows the leaf area estimates of cured low cost experimental tobacco harvested from the Rock Ridge Farms, N.C., 2010. The average plant population of the experimental tobacco was about 1.1 million plants per acre (approximately 70% of the seeded target population) several weeks before the first harvest in 2010. Therefore, assuming 1.1 million plants per acre and an average leaf area of 736 $cm^2$ per plant (weighted average above), the cured leaf area per acre for the Low Cost Production System's experimental tobacco is estimated to be approximately 809.6 million $cm^2$ per acre, almost 7 times greater than the 121 million $cm^2$/acre value obtained for the cured NC 71 variety produced and cured in the conventional flue-cured manner. See Table 14. This comparison is based only on the first harvest of the LCP system. The difference in leaf area per plant and per acre (unit area) further demonstrates the uniqueness to the product produced and the production method as compared to conventionally grown flue-cured tobacco.

TABLE 13

Estimate Leaf Area per Acre (First Harvest only)

| Harvest No. | No. of Seedlings | Stem Length (cm) | Leaves per Stem (No.) | Ave. per Leaf Length (cm) | Ave. per Leaf Width (cm) | Ave. per Leaf Area[1] ($cm^2$) | Ave. per Plant Area[1] ($cm^2$) |
|---|---|---|---|---|---|---|---|
| 1 | 14 | 26.46 | 7.50 | 21.26 | 7.41 | 110.70 | 830.25 |
| 2 | 25 | 29.52 | 7.96 | 21.23 | 6.94 | 103.63 | 824.88 |
| 3 | 15 | 25.03 | 7.00 | 18.34 | 5.53 | 71.28 | 498.99 |
| Weighted Averages (Over Harvests) | | 27.48 | 7.57 | 20.43 | 6.67 | 96.48 | 735.75 |

[1] Leaf Area = 0.703 × Length × Width (Suggs et al., Tob. Sci.: 194 (1960). The constant 0.703 is used for immature, more oval-shaped tobacco leaves compared to 0.634 for mature, more elongated leaves.

TABLE 14

Estimates of Leaf Areas for Mature Cured Leaves of Conventionally Grown Flue-Cured Virginia Tobacco - Variety NC 71

| Leaf Position | No. Sample Leaves | Wainwright Farms, NC 2011 Ave. per Leaf, cm Length | Wainwright Farms, NC 2011 Ave. per Leaf, cm Width | Leaf Area/ Leaf[1] $cm^2$ |
|---|---|---|---|---|
| Primings | 59[2] | 51.313 | 26.974 | 877.53 |
| 6 | 39 | 55.526 | 24.680 | 868.82 |
| 11 | 39 | 58.693 | 22.100 | 822.37 |
| 16 | 40 | 61.063 | 23.925 | 926.23 |
| Tip | 40 | 54.475 | 23.963 | 827.60 |
| | | | Ave. LA/Leaf = | 864.51 $cm^2$ |

[1] Leaf Area = 0.634 × Length × Width (Suggs et al., Tob. Sci. 4: 194 (1960). Leaves Leaves harvested Aug. 26, 2011, cured 8-9 days, and then measured on Sep. 7, 2011.
[2] Leaves selected from two farmer deliveries to ULTNA facility near Nashville, NC.

Estimate Leaf Area Per Plant:
Assume plants topped @ 21.5 lvs./plant×864.5 $cm^2$/leaf=18,587 $cm^2$/plant
Estimate Leaf Area Per Acre:
Assume 6,500 plants per acre (rows 46 in. wide and 20 in. plant spacing within rows): 6,500 plants/A×18,587 $cm^2$/plant=120.815 mil $cm^2$

What is claimed is:

1. A system for producing tobacco suitable for making manufactured tobacco products, comprising:
   (a) direct seeding of tobacco seeds at a rate sufficient to produce a plant population density of at least 500,000 tobacco plants per acre after germination;
   (b) mechanically harvesting above-ground portions of the tobacco plants at least one time during a growing season, to obtain harvested tobacco plant material comprising leaves attached to stalks, thereby obtaining a harvested tobacco plant material characterized by average stalks (stems) of between 2 to 60 inches, average green stalk (stem) thickness less than 1.5 inches, and an average of about 4 to 18 leaves per harvested plant; and
   (c) curing the harvested tobacco plant material comprising leaves attached to stalks to obtain a cured harvested tobacco plant material.

2. The system of claim 1, wherein a majority of the cured leaves have a cured midvein diameter of less than $11/32$ of an inch and a majority of the cured stalks have a cured stalk thickness of less than 1.5 inches.

3. The system of claim 1, wherein a majority of the cured leaves have a cured midvein diameter of less than $1/8$ of an inch and a majority of the cured stalks have a cured stalk thickness of less than 0.5 inches.

4. The system of claim 1, wherein a majority of the cured leaves have a cured midvein diameter of less than $3/32$ of an inch and a majority of the cured stalks have a cured stalk thickness of less than 0.3 inches.

5. The system of claim 1, further comprising mechanically threshing the cured harvested tobacco material comprising leaves attached to stalks, and recovering the cured harvested tobacco material as threshed cured tobacco material comprising at least 50% lamina yield.

6. The system of claim 1, comprising direct seeding of tobacco seeds at a rate sufficient to produce a plant population density of at least 750,000 tobacco plants per acre after germination.

7. The system of claim 1, comprising direct seeding of tobacco seeds at a rate sufficient to produce a plant population density of at least 1,500,000 tobacco plants per acre after germination.

8. The system of claim 1, comprising direct seeding of tobacco at a rate sufficient to produce a plant population density of at least 2,250,000 tobacco plants per acre after germination.

9. The system of claim 1, comprising one harvest during the growing season.

10. The system of claim 1, comprising two harvests during the growing season.

11. The system of claim 1, comprising three harvests during the growing season.

12. The system of claim 1, comprising four harvests during the growing season.

13. The system of claim 1, wherein the harvested tobacco plant material is further characterized by having a reducing sugars to total alkaloids ratio (RS/TA ratio) in total cured leaf material of the cured harvested tobacco material of between about 5 to 35.

14. The system of claim 1, wherein the harvested tobacco plant material is further characterized by having a reducing sugars to total alkaloids ratio (RS/TA ratio) in total cured stalk material of the cured harvested tobacco material of between about 10 to 225.

15. The system of claim 1, wherein the harvested tobacco plant material is further characterized by having nicotine levels in total cured leaf material of the cured harvested tobacco material of between below detectable levels to about 5%.

16. The system of claim 1, wherein the harvested tobacco plant material is further characterized by having nicotine levels (measured as total alkaloids) in total cured stalk material of the cured harvested tobacco material of between below detectable levels to about 1%.

17. The system of claim 1, wherein the harvested tobacco plant material is further characterized by having high leaf to stalk ratio of between 2:1 to 20:1.

* * * * *